United States Patent [19]
Sannohe et al.

[11] Patent Number: 5,579,138
[45] Date of Patent: Nov. 26, 1996

[54] POLARIZER HAVING A GLASS SUBSTRATE WITH FILMS ON EITHER SIDE WITH DIFFERENT WAVELENGTH CHARACTERISTICS AND PROJECTION DISPLAY USING SAME

[75] Inventors: Shinya Sannohe; Yoshito Miyatake, both of Neyagawa, Japan

[73] Assignee: Matsushita Electric Industrial Co., Ltd., Osaka-Fu, Japan

[21] Appl. No.: 218,957

[22] Filed: Mar. 28, 1994

[30] Foreign Application Priority Data

Apr. 1, 1993 [JP] Japan ................................. 5-075471

[51] Int. Cl.⁶ ........................... G02F 1/1335; G02B 1/10; G02B 5/28
[52] U.S. Cl. ........................... 359/63; 359/41; 359/583; 359/590; 359/49
[58] Field of Search ................................. 359/40, 41, 42, 359/48, 49, 583, 589, 590, 487, 502, 634, 629, 638, 639, 640, 831, 832, 837, 353

[56] References Cited

U.S. PATENT DOCUMENTS

| | | |
|---|---|---|
| Re. 32,521 | 9/1990 | Fergason . |
| 2,399,860 | 5/1946 | Dimmick ................. 359/640 |
| 2,403,731 | 7/1946 | MacNeille ................ 359/640 |
| 4,536,063 | 8/1985 | Southwell . |
| 4,931,315 | 6/1990 | Mellor ..................... 427/167 |
| 4,969,730 | 11/1990 | van den Brandt . |
| 5,153,752 | 10/1992 | Kurematsu et al. ......... 359/40 |
| 5,172,255 | 12/1992 | Atarashi . |
| 5,184,234 | 2/1993 | Mathewson ............... 359/40 |
| 5,200,843 | 5/1993 | Karasawa et al. .......... 359/40 |
| 5,221,982 | 6/1993 | Faris . |
| 5,223,956 | 6/1993 | Kramer et al. . |
| 5,235,444 | 8/1993 | de Vaan . |
| 5,237,446 | 8/1993 | Takahashi ................. 359/834 |
| 5,260,815 | 11/1993 | Takizawa . |

FOREIGN PATENT DOCUMENTS

| | | |
|---|---|---|
| 61-13885 | 1/1986 | Japan . |
| 63-56606 | 3/1988 | Japan . |
| 3257426 | 11/1991 | Japan . |
| 519249 | 1/1993 | Japan . |
| 5210084 | 8/1993 | Japan . |

*Primary Examiner*—William L. Sikes
*Assistant Examiner*—Kenneth Parker
*Attorney, Agent, or Firm*—Panitch Schwarze Jacobs & Nadel, P.C.

[57] ABSTRACT

A polarization separation mirror is made by evaporation-depositing a first multi-layers thin film and a second multi-layers thin film respectively on both surfaces of a transparent substrate, the mirror acts as a polarization beam splitter by cementing it between two transparent prism bodies. By shifting the relative film thicknesses of the first multi-layers thin film and of the second multi-layers thin film, reflecting wavelength range for the S-polarization component is changed.

23 Claims, 20 Drawing Sheets

POLARIZER HAVING A GLASS SUBSTRATE WITH FILMS ON EITHER SIDE WITH DIFFERENT WAVELENGTH CHARACTERISTICS AND PROJECTION DISPLAY USING SAME

BACKGROUND OF THE INVENTION

1. Field of the Invention

The present invention relates to a polarizing apparatus that acts both as a polarizer and an analyzer and also to a projection display apparatus that enlarges and projects optical images formed on a reflection type light valve using the above-mentioned polarizing apparatus.

2. Description of the Prior Art

In order to obtain large-size picture images, a hitherto known method is to form optical images on a light valve operating by video signals, illuminate a projection light on this optical images and project the optical images in enlarged size on a screen through a projection lens. In recent years, a projection display apparatus using a liquid crystal display as a light valve attracts much attention. And upon aiming at the high resolution capability, the Japanese unexamined Patent publication (Tokkai Sho) 61-13885t (M. Himuro) proposed a reflection type liquid crystal display that is easily expandable to a large capacity apparatus with regard to the pixel number without spoiling the pixel aperture factor of a liquid crystal display.

An outline configuration of a conventional projection display apparatus using the above-mentioned liquid crystal display is shown in FIG. 19. A light beam 2 emitted from a light source 1 is collimated into a nearly parallel beam, and then the light beam is separated into an S-polarization component 4 which is reflected by a polarization beam splitter 3 and a P-polarization component 5 which transmits therethrough. The S-polarization component 4 is incident upon a liquid crystal display 6. The liquid crystal display 6 is of the kind that utilizes a property of the birefringence of a liquid crystal, and each picture element has individual reflecting electrode for reflecting light. In case that no voltage is applied to the liquid crystal layer, no birefringence property is exhibited actually, whereas when voltage is applied, the birefringence property takes place. Therefore, when a linearly polarized light having its polarization direction in a specified direction is incident, its reflected light becomes an elliptically polarized light.

The S-polarization component 4 is partially converted into the P-polarization component by the liquid crystal display 6 and is incident again into the polarization beam splitter 3. The P-polarization component included in the reflected light from the liquid crystal display 6 transmits through the polarization beam splitter 3 and incident into a projection lens 7, whereas the S-polarization component is reflected thereby and proceeds toward the light source 1. In such the manner, an optical image formed as the change of the birefringence property on the liquid crystal display 6 is expanded and projected onto a screen (not shown) by a projection lens 7.

In the reflection type liquid crystal display device, switching elements can be disposed behind the picture element electrodes. Therefore, the picture element pitch can be reduced without reducing the size of the switching elements, and hence the high density integration of the picture element is not a difficult task. Therefore, by the use of the reflection type liquid crystal display device, a brighter and higher resolution projection image in comparison with the use of the transmitting type liquid crystal display device can be obtained.

In the configuration shown in FIG. 19, when black is to be displayed, the S-polarization component 4 incident onto the liquid crystal display 6 is reflected back as it was (S-polarization component) without receiving any conversion into the P-polarization component. The more the amount of residual S-polarization component transmitting through the polarization beam splitter 3 and being incident onto the projection lens 7, the less the resultant contrast of the projection image becomes. Therefore, in order to obtain a high contrast projection image, it is required to make the S-polarization component transmittance of the polarization beam splitter 3 very low.

In general, as for the polarization beam splitter 3, those type as that proposed by S. M. MacNEILLE in the U.S. Pat. No. 2,403,731 are mostly used. The U.S. Patent discloses an optical device in which two glass prisms are joined together to form a cubic shape or a rectangular parallelo-piped shape, and therein an optical multi-layers thin film is formed on the joining surfaces. The optical multi-layers thin film is formed by alternately laminating two different kinds of thin films each of which has a mutually different refractive index from the others. This configuration has an action of separating the natural light into two polarization components having mutually-orthogonal planes of polarization. Materials and the film thicknesses of those two thin films are selected to fulfill the Brewster's angle condition that the transmittance of the P-polarization component becomes 100% at a specified wavelength. This Brewster's angle condition is expressed with the incident angle $\theta_G$ onto the multi-layers thin film, the refractive index $n_G$ of the glass prisms, the refractive index $n_L$ of the lower refractive index thin film, and the refractive index $n_H$ of the higher refractive index thin film, as follows:

$$\sin^2\theta_G = \frac{(n_L n_H)^2}{n_G^2(n_L^2 + n_H^2)} \quad (1)$$

When the condition of EQ.(1) is fulfilled, it is possible, with keeping the transmittance of the P-polarization component to 100%, to reduce the transmittance of the S-polarization component by increasing the number of layers of the multi-layers thin film.

However, the wavelength bandwidth of the polarization beam splitter wherein separation of the two polarization components are carried out is relatively narrow. Therefore, in case of a projection display apparatus using white light, it is difficult to keep the transmittance of the S-polarization component low over the whole wavelength bandwidth over the visible light range.

For this problem there has been such a proposal that the white, light emitted from a light source is decomposed into three primary colors of red, green, and blue, and three polarization beam splitters respectively corresponding to those three wavelength band ranges are provided.

According to such conventional configuration, even though transmittances of those respective S-polarization components at respective wavelength ranges of particular color components can be kept low, cost naturally rises and also the size of apparatus and weight increase since three of joined block of glass prisms are used. Moreover, since it is usually the case that the incident light is not perfectly parallel, in such a case, wavelength shift is liable to take place owing to an incident angle dependence of the light. And a narrow wavelength bandwidth of the transmittance of the S-polarization component becomes practically further narrower. Accordingly, when it is intended to obtain a high contrast projection image with such configuration, the substantially parallel light only must be used. Therefore, a difficulty arises in producing sufficient bright picture images.

SUMMARY OF THE INVENTION

The present invention is to solve the above-mentioned problems, and purposes to offer a polarizing apparatus that is capable of keeping the reflectance for the S-polarization component high over a wide wavelength range and also has little dependence to light incident angle dependence. And it purposes also to offer a projection display apparatus capable of displaying a bright and high quality projection image using the above-mentioned polarizing apparatus.

In order to accomplish the above-mentioned purpose, the polarizing apparatus of the present invention comprises a first transparent body, a second transparent body, at least one transparent plane parallel substrate, and at least two polarization component separation means. Both of the above-mentioned first and second transparent bodies respectively have at least three plane surfaces, and the transparent plane parallel substrate and the polarization component separation means are held between the first transparent body and the second transparent body. And spectral transmittance characteristics for the S-polarization component of those two, at lest, polarization component separation means are different to each other.

And it is also possible to build the polarizing apparatus by instructing a liquid holding vessel with at least three transparent plates and a frame, and by using a transparent material which is in liquid phase at least at the time of assembly as the transparent bodies, and then by filling a transparent material in the above-mentioned vessel.

By forming respective polarization component separating means having mutually different spectral transmittance of S-polarization component on two interfaces formed between respective transparent bodies and the transparent parallel planed substrate, the light polarizing apparatus of the present invention acts as a polarization beam splitter whose transmittance of totally integrated S-polarization component can be kept very low over a wide wavelength range and, and at the same time, whose incident angle dependence is kept very little. If this polarizing apparatus is used for a projection display apparatus using a reflection type birefringent light valve, the S-polarization component that is reflected by the light valve as for the black display part can be shut out effectively, and hence projection image of a high contrast can be displayed.

Since the transmittance of the S-polarization component can be made very low over all the visible wavelength range by a single polarizing apparatus, even when white light is decomposed into three primary colors of red, green, and blue, and three light valves corresponding to those three primary colors are used, there is no necessity to use a plural number of polarizing apparatus. As a result, a projection display apparatus using this polarizing apparatus can be made in a compact size.

And, if a material which is liquid at lest at the time of assembly is used as for a transparent body, materials of lower cost than that of the glass prism can be chosen. Since those assembly process and liquid filling process are rather easily workable, a light polarizer using the liquid materials can be produced in a lower cost in comparison with the polarization beam splitter using glass prisms.

In the polarizing apparatus of the present invention, in case that the P-polarization component is reflected by its outgoing plane or the like, resulting in a main cause of lowering the contrast, arrival of unnecessary light component to the screen can be avoided by providing a light absorbing means in place of or the inside of the outgoing plane.

Advantages of the light polarizer of the present invention are, as is evident as described above, that the transmittance of the S-polarization component can be kept low over a wide wavelength bandwidths, and besides that the incident angle dependence is little. And advantages of the projection display apparatus using the polarizing apparatus of the present invention are that the bright and high contrast projection image can be displayed and that the size of the apparatus is compact.

The feature and the effect of the present invention will be made more evident by referring to the later-described embodiments and their accompanying drawings.

Figure 1A:
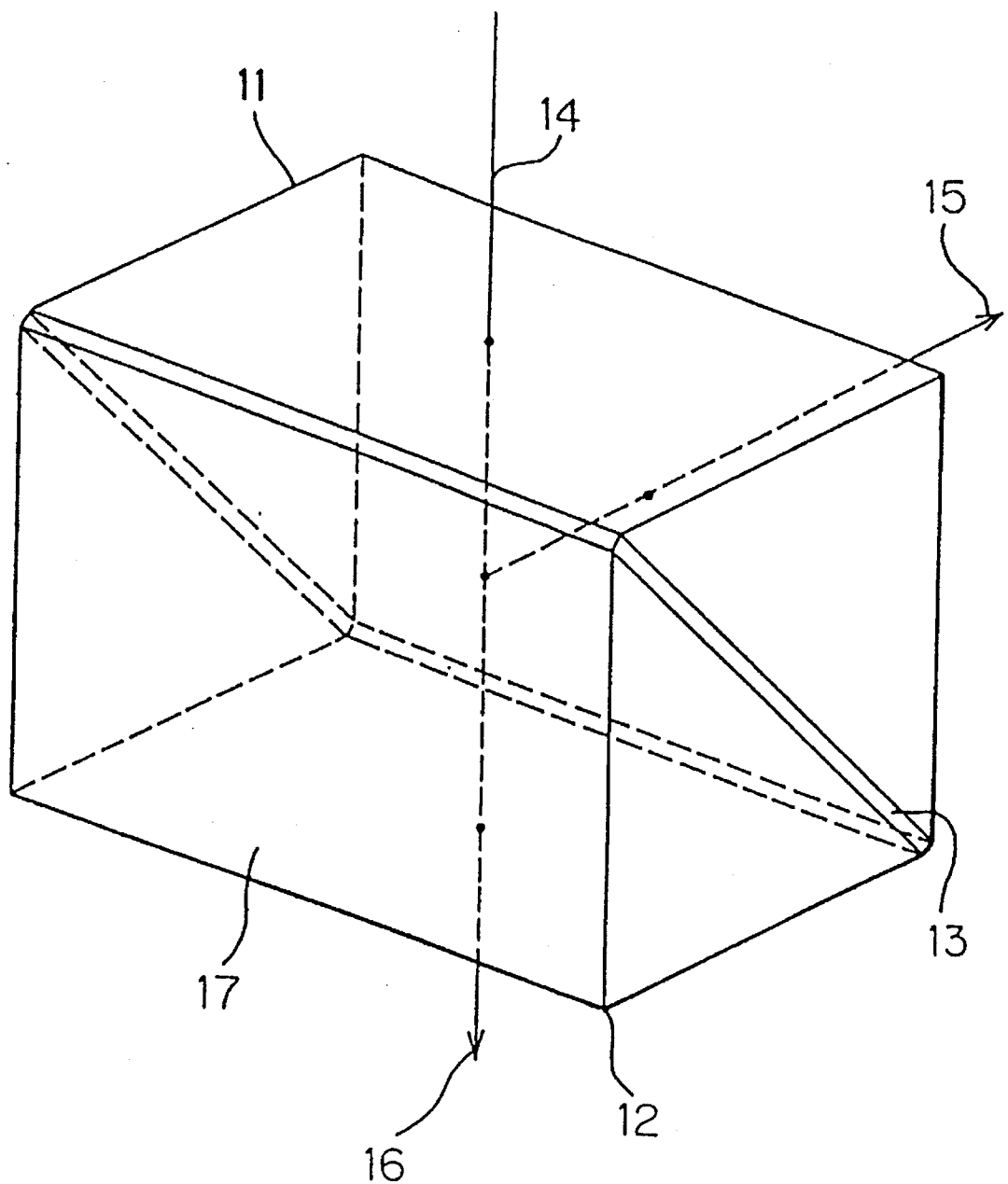
FIG. 1A and FIG. 1B are perspective views of embodiments of polarizing apparatus of the present invention.

It will be recognized that some or all of the Figures are schematic representations for purposes of illustration and do not necessarily depict the actual relative sizes or locations of the elements shown.

DESCRIPTION OF THE PREFERRED EMBODIMENTS

Now, Explanation is given on embodiments of the present invention referring to the drawings.

FIG. 1A is a drawing showing the constitution of a polarizing apparatus of the present invention, wherein two triangular pillar shaped prisms are used for glass prisms 11 and 12. They are joined to each other sandwiching a polarization separation mirror 13 therebetween. Light incident on the prism 11 is separated into an S-polarization component 15 and a P-polarization component 16 by the polarization separation mirror 13.

Figure 2:
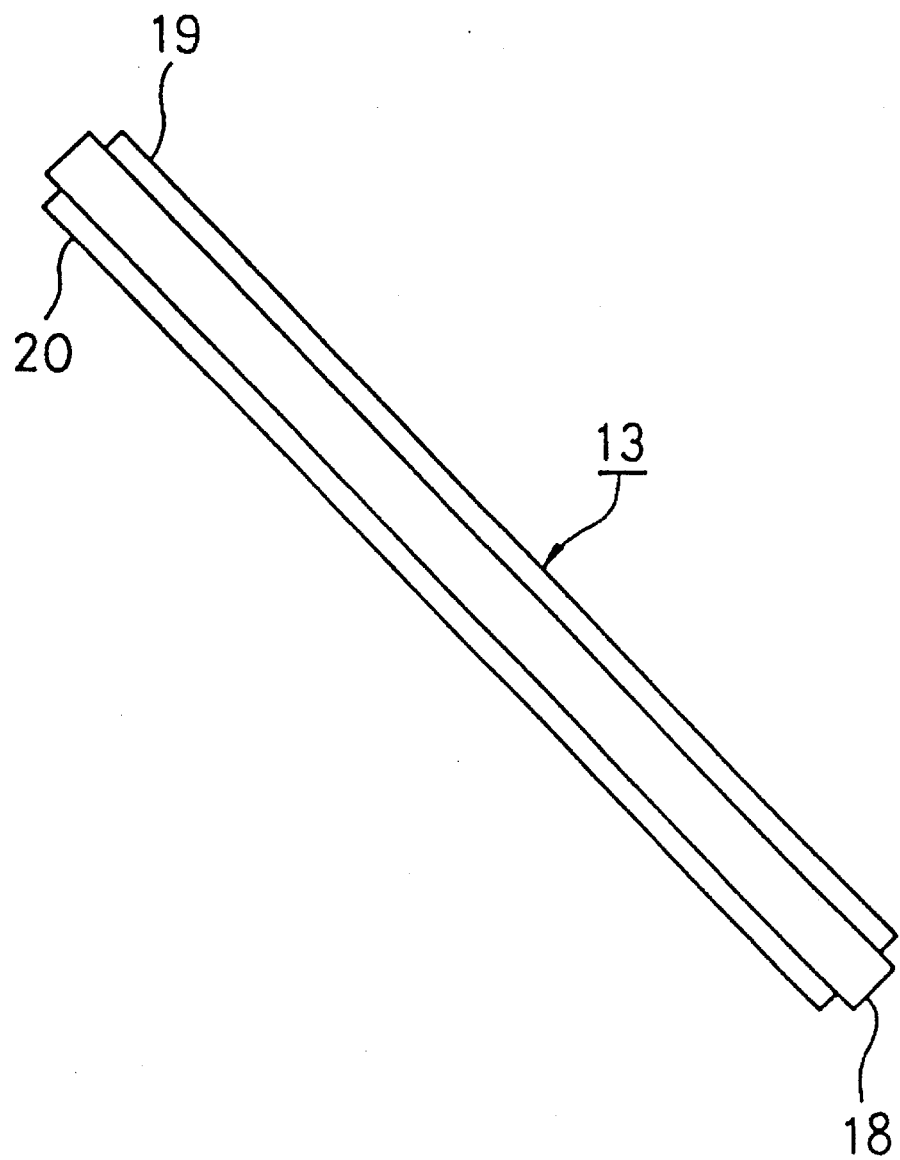
FIG. 2 is an outline drawing of the constitution of a polarization separation mirror.

Constitution of the polarization separation mirror 13 is shown in FIG. 2. On both surfaces of the glass substrate 18 of a thickness of 1 mm, a first multi-layer thin film 19 and a second multi-layers thin film 20 are evaporation-deposited respectively. The multi-layer thin films 19 and 20 are made by respective laminating of low refractive index film and high refractive index film. By sandwiching the thus prepared polarization separation mirror 13 tightly between the glass prisms 11 and 12, a resulted composite body works as a polarization beam splitter. The thin films configuration and the layer number of the first multi-layer thin film 19 and those of second multi-layer thin film 20 are selected to be same to each other. And by relatively shifting the film thickness, the wavelength ranges for reflecting the S-polarization component are varied from each other. By such configuration, it became possible to keep a total spectral transmittance for the S-polarization component very low over a wide wavelength range, and moreover the incident angle dependence over usable wavelength range can be made very little.

The configurations of the multi-layers thin films 19, 20 of the present embodiment in accordance with the combination based on the condition equation (1) mentioned before are shown in TABLE 1. Setting the standard incident angle onto the polarization separation mirror 13 to be 45°, the materials are selected that a dense flint glass of a refractive index of 1.755 for the glass prisms 11 and 12, a float glass plate of a refractive index of 1.52 for the glass substrate 18 of the polarization separation mirror 13, and silicon dioxide of a refractive index of 1.46 for the low refractive index films and titanium dioxide of a refractive index of 2.3 for the high refractive index films. The film thickness d is the physical film thickness.

TABLE 1

| | | Standard Incident Angle 45° | |
|---|---|---|---|
| | Refractive Index | First Multi-Layer Thin Film Film Thickness d (nm) | Second Multi-Layer Thin Film Film Thickness d (nm) |
| | 1.52 | — | — |
| 1 | 1.46 | 143.8 | 107.9 |
| 2 | 2.30 | 91.3 | 68.5 |
| 3 | 1.46 | 143.8 | 107.9 |

TABLE 1-continued

| | | Standard Incident Angle 45° | |
|---|---|---|---|
| | Refractive Index | First Multi-Layer Thin Film Film Thickness d (nm) | Second Multi-Layer Thin Film Film Thickness d (nm) |
| 4 | 2.30 | 91.3 | 68.5 |
| 5 | 1.46 | 143.8 | 107.9 |
| 6 | 2.30 | 91.3 | 68.5 |
| 7 | 1.46 | 143.8 | 107.9 |
| 8 | 2.30 | 91.3 | 68.5 |
| 9 | 1.46 | 143.8 | 107.9 |
| 10 | 2.30 | 91.3 | 68.5 |
| 11 | 1.46 | 143.8 | 107.9 |
| 12 | 2.30 | 91.3 | 68.5 |
| 13 | 1.46 | 143.8 | 107.9 |
| | 1.755 | — | — |

Figure 3:
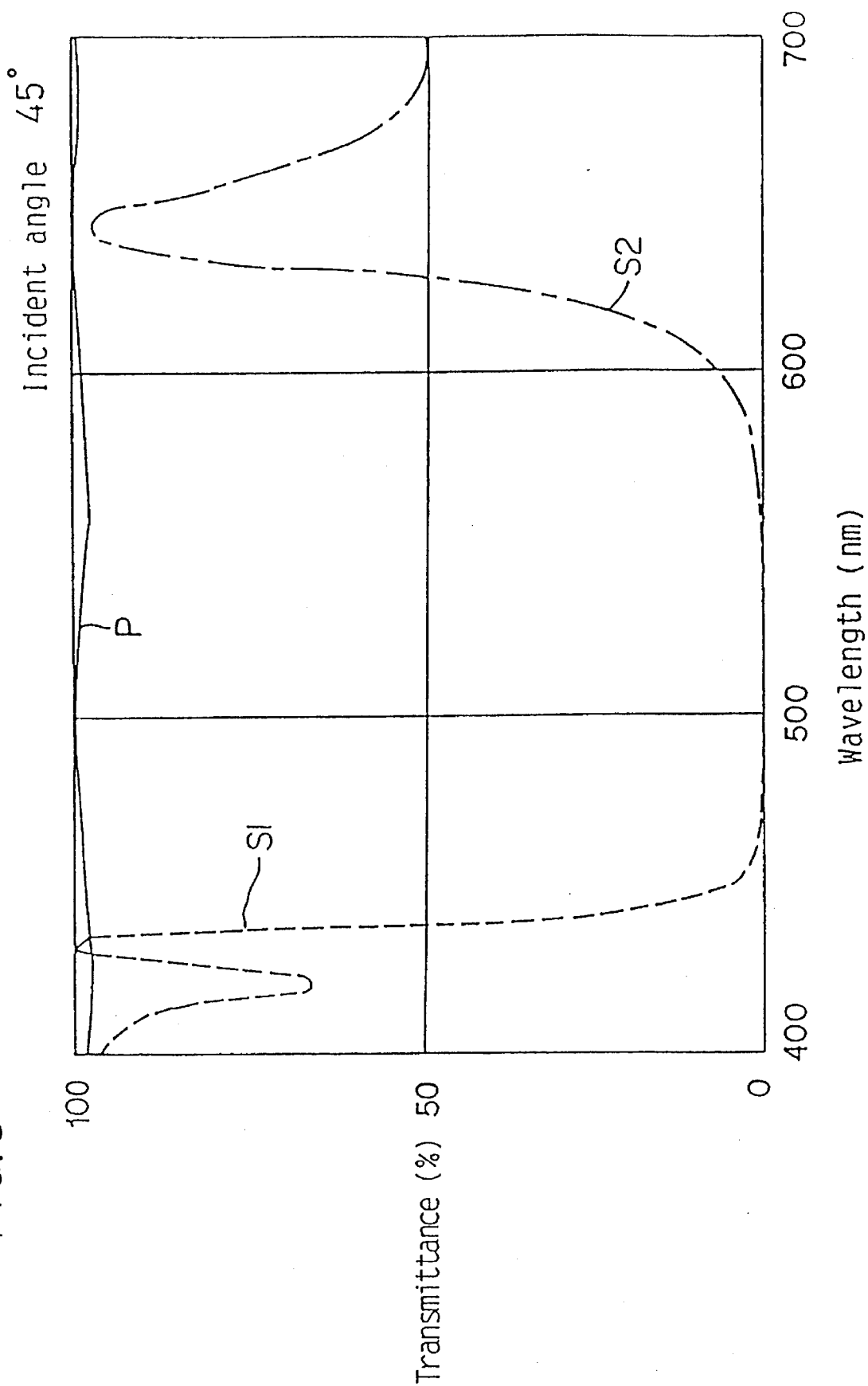
FIG. 3 is a characteristic curve for explaining a spectral transmittance of the polarizing apparatus of the present invention.
Figure 4:
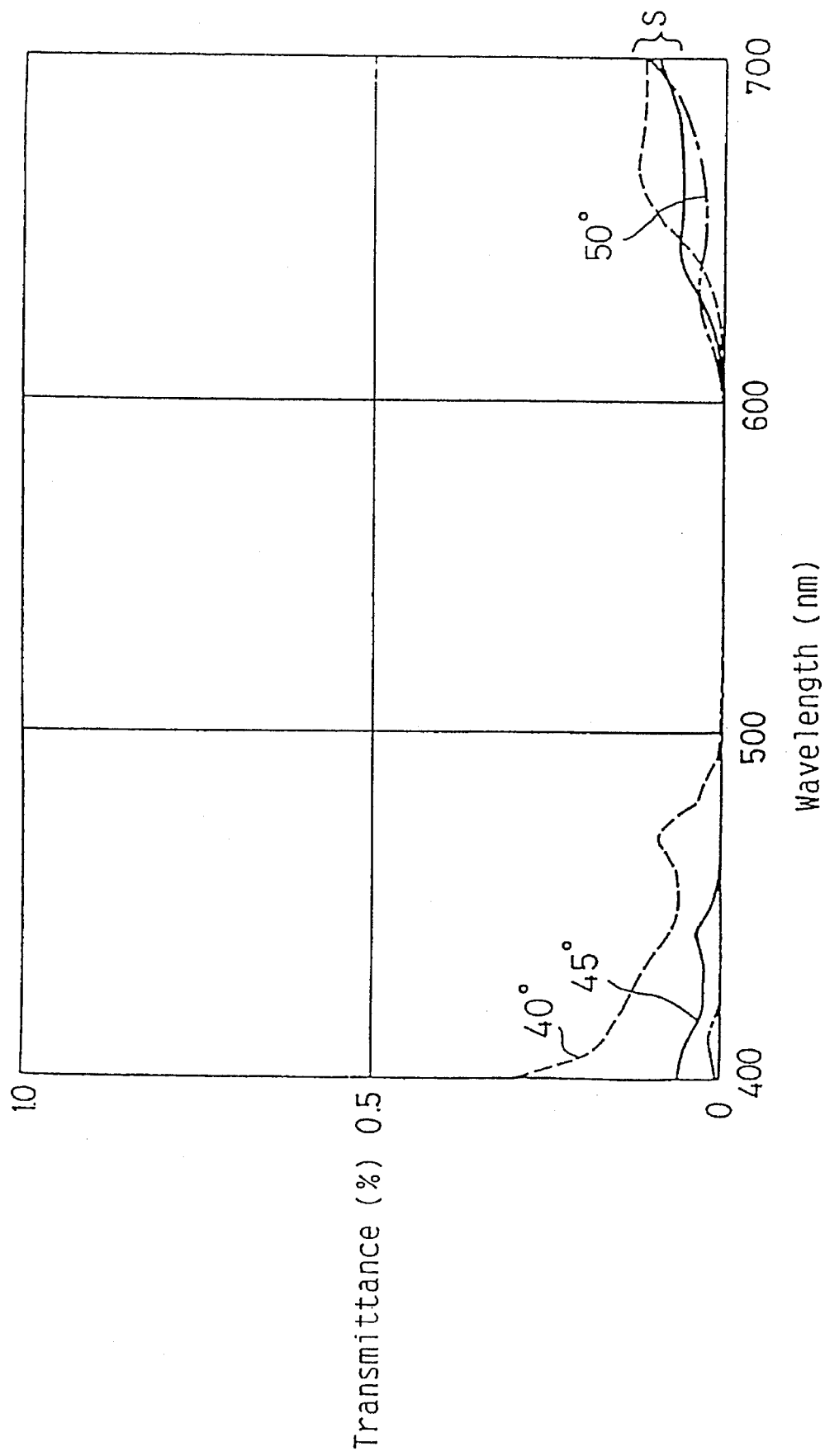
FIG. 4 is a characteristic curve for explaining another spectral transmittance of the polarizing apparatus of the present invention.

Spectral transmittance of the polarization separation mirror of the configuration of TABLE 1 over a wavelength range from 400 nm to 700 nm is shown in FIG. 3 and FIG. 4. FIG. 3 shows spectral transmittance of the P-polarization component and the S-polarization component, wherein the total P-polarization component transmittance (P) is shown by a solid curve, whereas the S-polarization component transmittance of the first multi-layers thin film (S1) is shown by a broken curve, and the S-polarization component transmittance of the second multi-layers thin film (S2) is shown by a dotted broken curve (a chain line curve). As is understood from the curves, transmittance of the P-polarization component is as high as more than 90%, and the transmittance concerning the S-polarization component, the first multi-layer thin film has low transmittance in the longer wavelength side (about 490 nm–700 nm) while the second multi-layer thin film has low transmittance in the shorter wavelength side (400 nm–550 nm). Thereby the total transmission for the S-polarization component is kept as low as less than 0.1%.

FIG. 4 shows the incident angle dependency of the S-polarization component transmittance (S) of the polarization separation mirarot. Numerals in the figure represent incident angles onto the polarization separation mirror. Thus those three curves in the figure illustrate the behavior of variations of transmission induced by ±5° deviations in the incident angle, expressed in the angle converted to that of the air, from the standard incident angle of 45°. From this figure, the transmittance of the S-polarization component can be kept as low as less than 0.4% over 400–700 nm even at the time when the incident angle of the light leans as much as ±5°, meaning that the incident angle dependency is very little.

For the first multi-layer thin film 19 and the second multi-layer thin film 20, also by evaporation-depositing them respectively on those two glass prisms 11 and 12, the same result can be obtained.

Figure 1B:
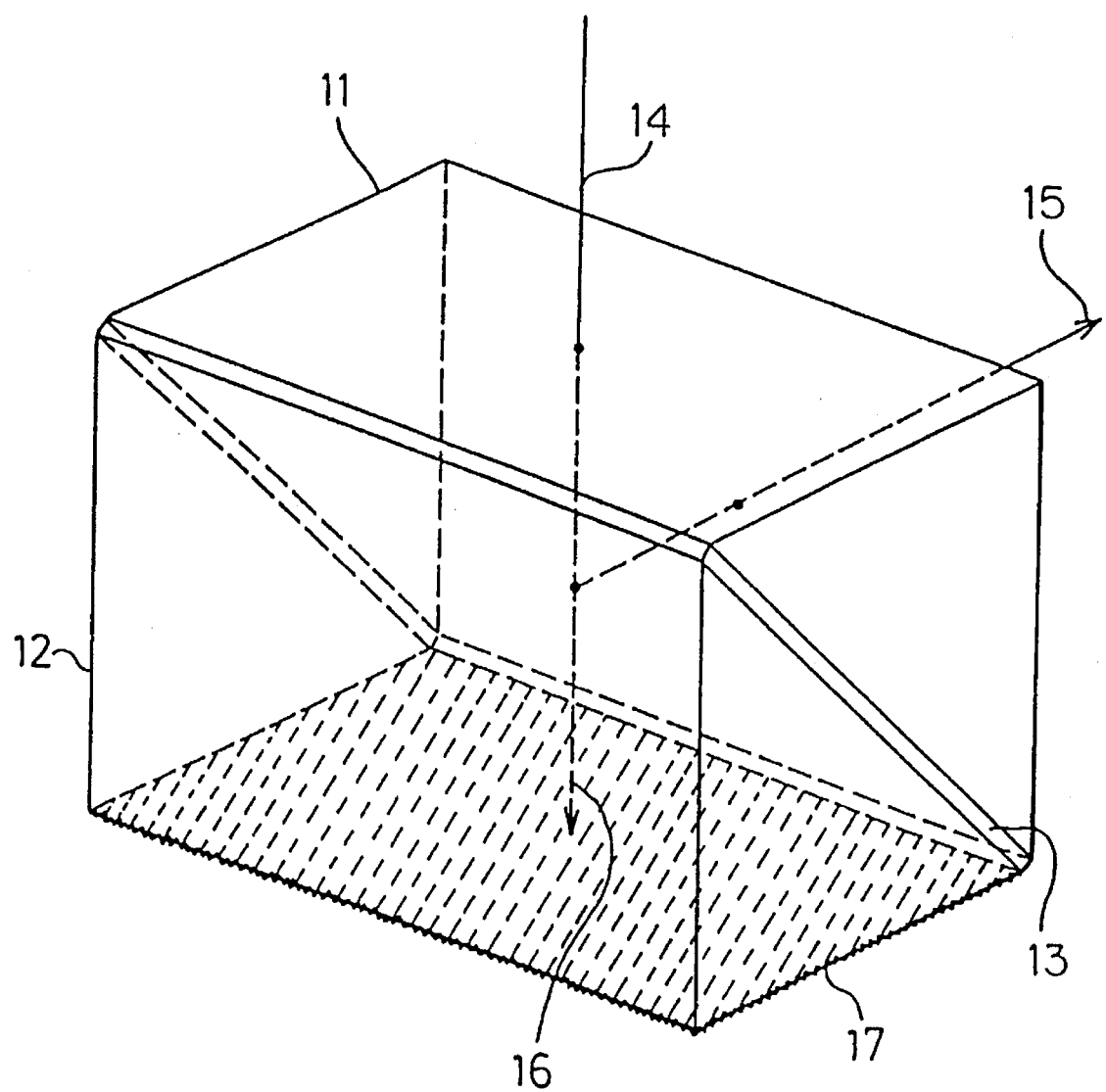

In case where the polarizing apparatus of the present invention is used in a projection display apparatus using a reflection type birefringent light valve, although the most part of the unnecessary P-polarization component 16 outgoes from the outgoing plane shown in FIG. 1A, a part thereof is reflected by this outgoing plane and propagates toward the screen. Such reflection often happens to cause an unfavorable influence of lowering the contrast of the projection image. In that case, it is possible to prevent such lowering of the contrast by providing a light absorbing layer 17 by forming a minute roughness on the outgoing plane and coating an absorbing material over the outside surface thereon shown in FIG. 1B. A preferred example of such light absorbing layer is made by sand blasting the bottom face 17 of the prism 12 and then applying a block coating thereon.

Figure 5:
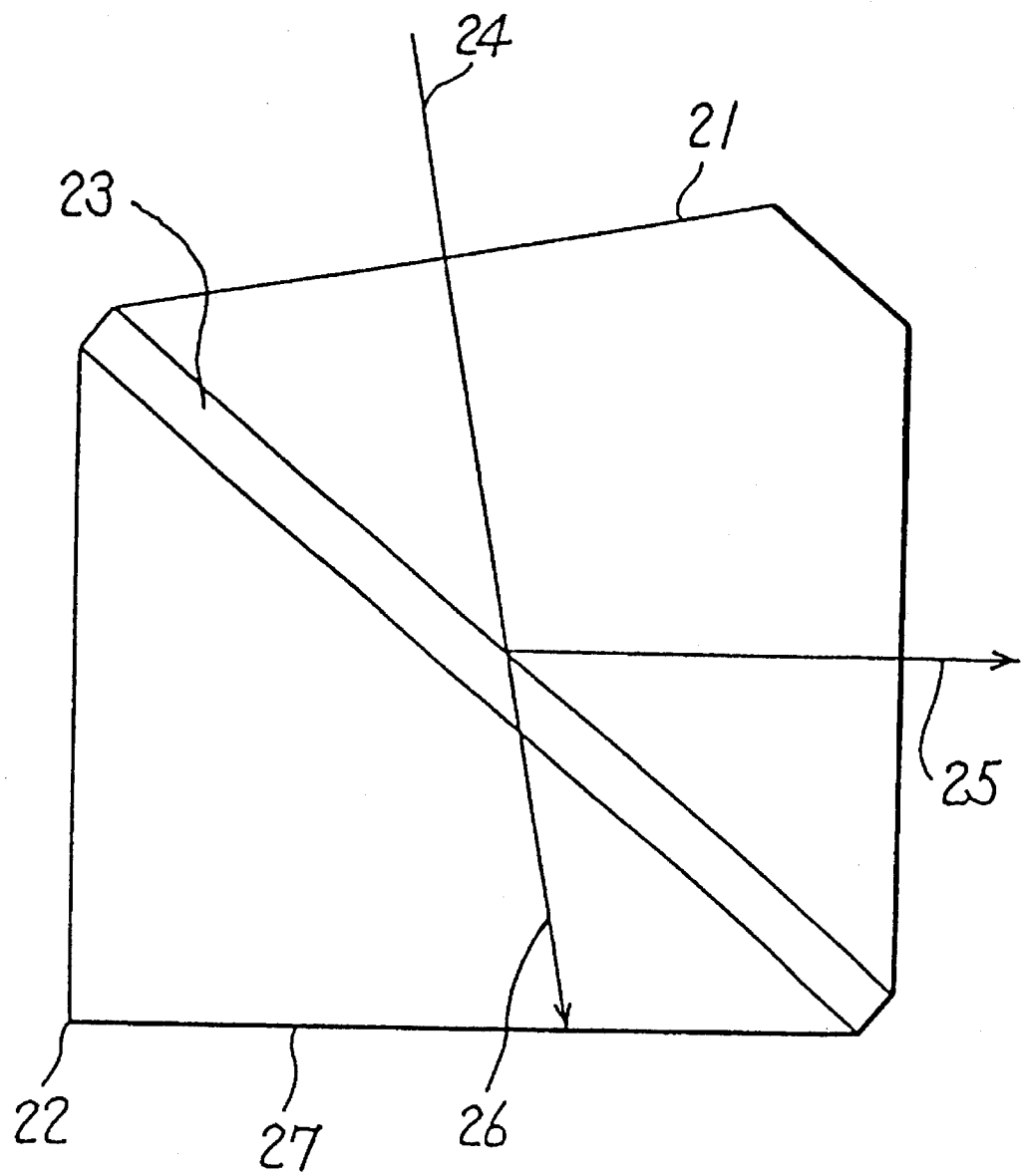
FIG. 5 is a cross-sectional side view of the polarizing apparatus of the present invention.

Constitution of another embodiment of the present invention is shown in FIG. 5.

A glass prism 21 is a square pillar shaped prism having a cross-sectional form of trapezoid that is obtainable by cutting a tip part of an equilateral triangle, and a glass prism 22 is a triangular pillar shaped prism. These glass prisms 21 and 22 are joined including a polarization separation mirror 23 therebetween. The glass prism 21 is prepared such that the incident angle of the incident light 24 on the polarization separation mirror 23 becomes 50°. Similarly as in the constitution of FIG. 1, the incident light 24 is separated into an S-polarization component 25 and a P-polarization component 26.

For the polarization separation mirror 23 as in the aforementioned embodiment, on both surfaces of a glass substrate, a first multi-layers thin film and a second multi-layer thin film are formed. Those multi-layers films are respectively formed by laminating low refractive index films and high refractive index films alternately. The configuration of the multi-layer thin films used for the polarization separation mirror used in the constitution of FIG. 5 is shown in TABLE 2. Taking a standard incident angle on the polarization separation mirror 23 to be 50°, the following materials are used:

borosilicate crown glass of a refractive index of 1.516 for the glass prisms 21 and 22, a float glass plate of refractive index of 1.52 for the glass substrate of the polarization separation mirror 23, magnesium difluoride of a refractive index of 1.39 for the low refractive index films, and zinc sulfate of a refractive index of 2.3 for the high refractive index films.

TABLE 2

| | | Standard Incident Angle: 50° | |
|---|---|---|---|
| | Refractive Index | First Multi-Layer Thin Film Film Thickness d (nm) | Second Multi-Layer Thin Film Film Thickness d (nm) |
| | 1.52 | — | — |
| 1 | 1.39 | 151.1 | 113.3 |
| 2 | 2.30 | 91.3 | 68.5 |
| 3 | 1.39 | 151.1 | 113.3 |
| 4 | 2.30 | 91.3 | 68.5 |
| 5 | 1.39 | 151.1 | 113.3 |
| 6 | 2.30 | 91.3 | 68.5 |
| 7 | 1.39 | 151.1 | 113.3 |
| 8 | 2.30 | 91.3 | 68.5 |
| 9 | 1.39 | 151.1 | 113.3 |
| 10 | 2.30 | 91.3 | 68.5 |
| 11 | 1.39 | 151.1 | 113.3 |
| 12 | 2.30 | 91.3 | 68.5 |
| 13 | 1.39 | 151.1 | 113.3 |
| | 1.516 | — | — |

Figure 6:
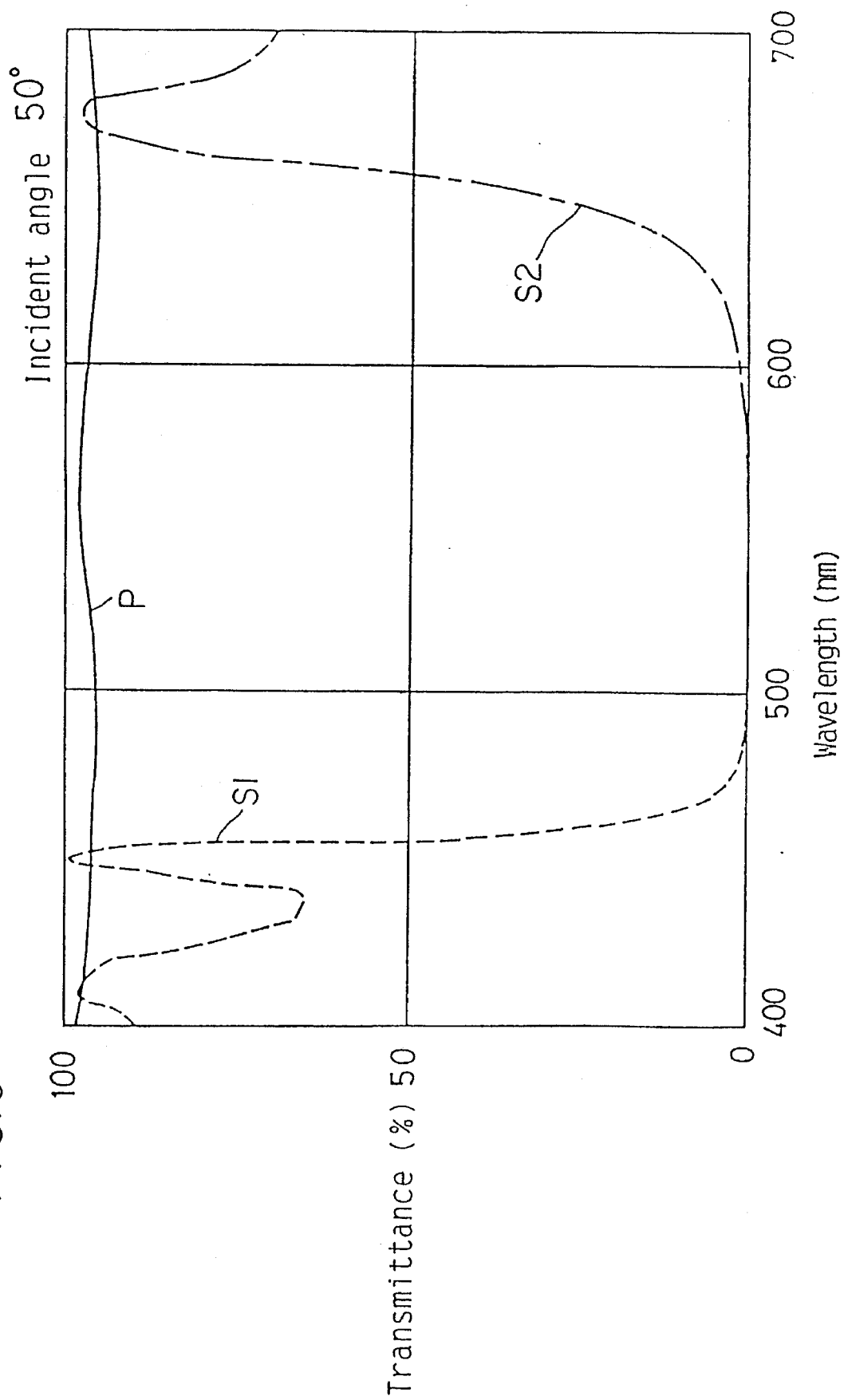
FIG. 6 is a characteristic curve for explaining a spectral transmittance of the polarizing apparatus of the present invention.
Figure 7:
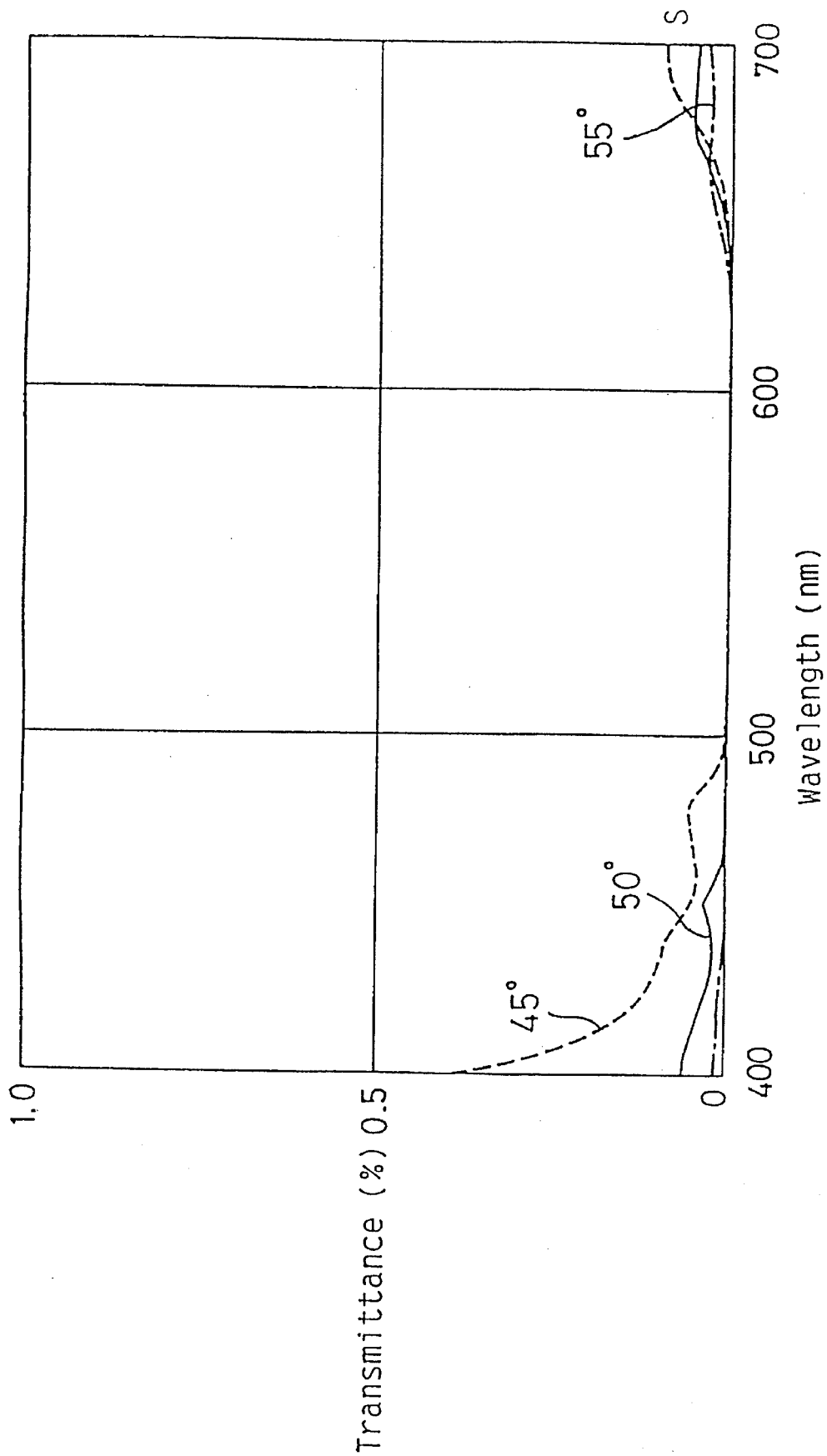
FIG. 7 is a characteristic curve for explaining another spectral transmittance of the polarizing apparatus of the present invention.

Spectral transmittance of the polarization separation mirror of TABLE 2 over a wavelength range of 400 nm to 700 nm is shown in FIG. 6 and FIG. 7. In these graphs, as in FIG. 3 and FIG. 4, in FIG. 6, the total P-polarization component transmittance (P) is shown by a solid curve, the S-polarization component transmittance of the first multi-layer thin film (S1) is shown by a broken curve, and the S-polarization component transmittance of the second multi-layer thin film (S2) is shown by a dotted broken curve. In FIG. 7, on the total S-polarization component transmission, its incident angle dependency is shown. It is understood from FIG. 6 and FIG. 7, similarly as in the constitution of FIG. 1, that the transmission of the P-polarization component is kept as high as more than 90% whereas the transmission of the S-polarization component is kept as low as less than 0.4% over a wavelength range of 400 nm to 700 nm even for the incident angle of the light leans as much as ±5° (in air) from the standard incident angle (50°). Accordingly, it is also understood that the incident angle dependency is also very little.

Also in the constitution shown in FIG. 5, the first multi-layer thin film and the second multi-layers thin film can be made similarly by evaporation-depositing them respectively on those two glass prisms 21 and 22.

Furthermore, in the constitution of FIG. 5, similarly as in the constitution shown in FIG. 1A, when the polarizing apparatus of the present invention is used in a projection display apparatus using a reflection type birefringent light valve and the P-polarization component 26 gives an unfavorable influence on the contrast of the projection image, it is possible to prevent a lowering of the contrast by providing a light absorbing means (the same as a light absorbing means 17 shown in FIG. 1B) by forming a minute roughness on the outgoing plane 27 and coating an absorbing material over the outside surface thereon.

Hereupon, the standard incident angle of the light onto the polarization separation mirror is not to be limited to that of the above-mentioned embodiment, and any other configuration can be employed as far as the above-mentioned EQ.(1) is fulfilled as the combination of the refractive index of the glass prisms and the refractive index of the thin films.

Figure 8:
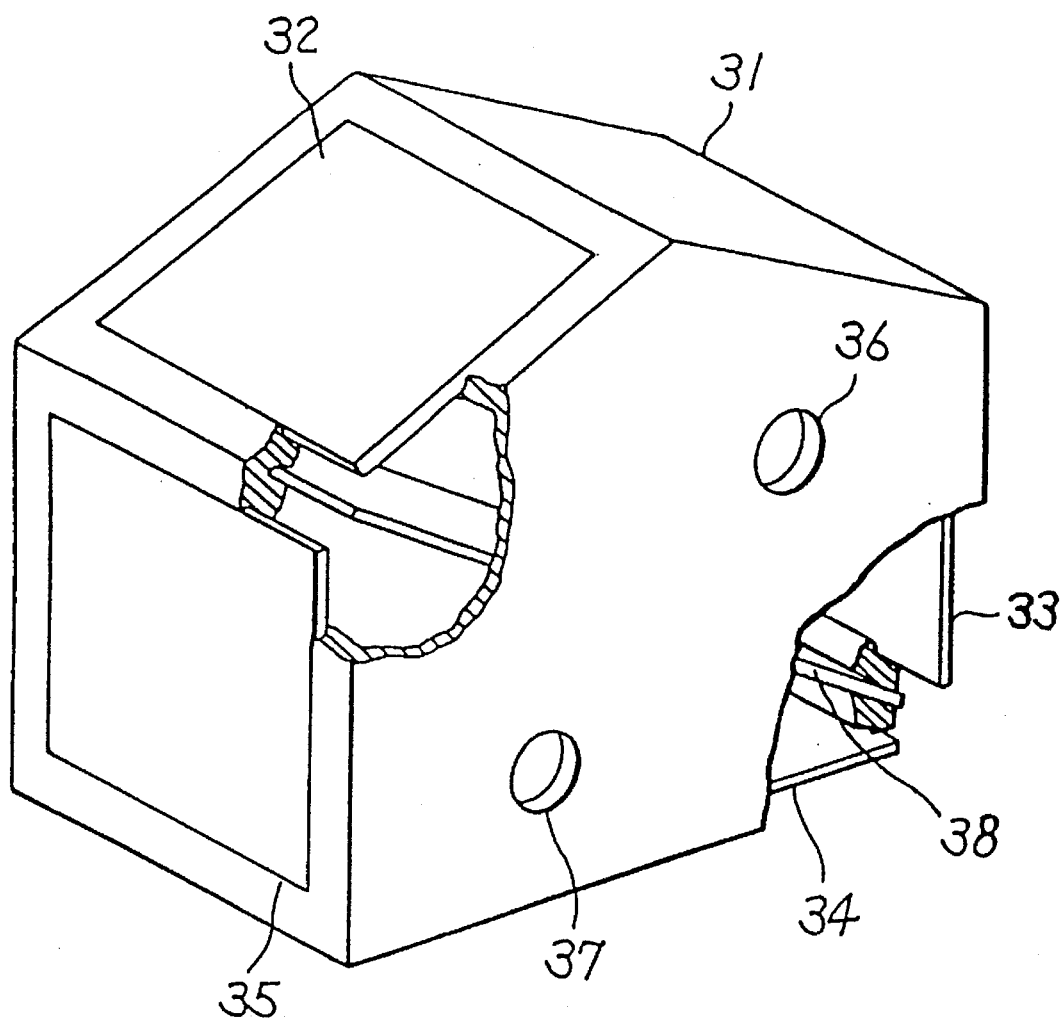
FIG. 8 is a partially broken perspective view of the polarizing apparatus of the present invention.

Constitution of another embodiment of the present invention is shown in FIG. 8. On the frame body 31 four transparent glass plates 32, 33, 34, and 35 are attached and fixed, thereby forming a container in which a liquid is held. These four transparent glass plates 32, 33, 34, or 35, act as a light incident window or as an outgoing window. In the frame body 31 a polarization separation mirror 38 is inserted and fixed such that it forms an intersecting angle of 60° with transparent plates 32 and 33. Inside the container, such a transparent material that which is liquid at least at the time of assembly is injected through injecting holes 36 and 37, which are sealed thereafter.

Figure 9:
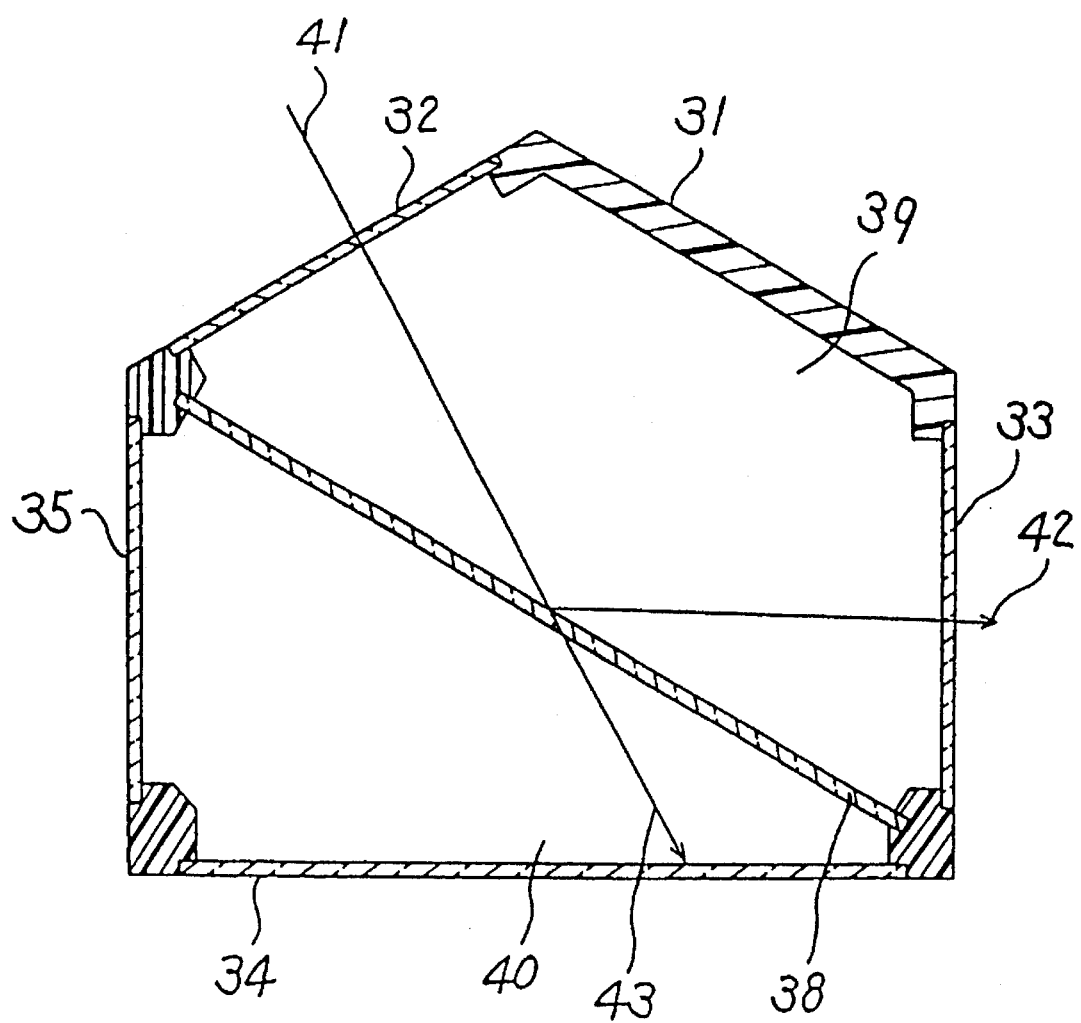
FIG. 9 is a cross-sectional side view of the polarizing apparatus of the present invention.

FIG. 9 shows a cross-sectional constitution of the light polarizer of FIG. 8. Similarly to in the aforementioned embodiment, the polarization separation mirror 38 is made by forming on both surfaces of a glass substrate a first multi-layers thin film and a second multi-layers thin film, by laminating low refractive index films and high refractive index films alternately with respective specified thicknesses. The polarization separation mirror formed as described above can act as a polarization separation beam splitter by letting it contact with transparent bodies 39 and 40.

As for the transparent bodies 39 and 40, it is convenient that they are liquid at least at the time of assembly. If they are liquid at the time of assembly, it is easy to let the polarization separation mirror 38, the transparent plates 32, 33, 34, and 35 make contact with the transparent bodies 39 and 40 without leaving air on interfaces therebetween. Those glass substrates used as the transparent plates 32, 33, 34, and 35 cost far less than block transparent body, and the transparent bodies 39 and 40 is small in their volume, and therefore, their material cost are very cheap. Furthermore, since the process of filling the liquid into the container is easy to carry out, the polarizing apparatus of the present embodiment can be produced far less in its cost in comparison with the polarization beam splitter using glass prisms.

Silicone resin are suitable as materials for the transparent bodies 39 and 40. Since the silicone resins are heat-resistive in general and the glass substrate and the multi-layer thin film are also excellent in the thermostability, the polarizing apparatus can be placed in the vicinity of a light source of high temperature. In case of using liquid as the transparent bodies, silicone oil can be used conveniently. More desirable material as the transparent material, is that which is in a liquid phase at the time of assembly and is transformed into a gel phase after the completion of the assembly, for avoiding a leak of liquid stuff from the container during the time of operation. As for a material as described above, a transparent silicone resin KE1051, which is a product of Shin-Etsu Chemical Co., Ltd. can be used. This material is supplied in two-liquid formula consisting of liquid A and liquid B. In both of the two liquid materials, liquid A and liquid B, silicone oil expressed by the below-mentioned chemical formula (1) is contained respectively.

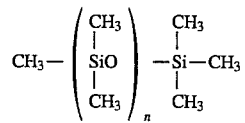

[Chemical Formula 1]

The liquid B contains a crosslinking agent expressed by the below-mentioned chemical formula (2) and a mixture amount of platinum catalyzer:

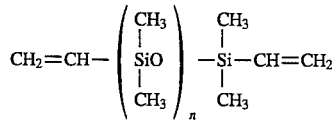

[Chemical Formula 2]

The liquid B contains a crosslinking agent expressed by the below-mentioned chemical formula (3):

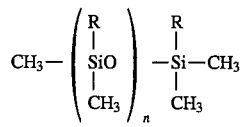

where —R is —$CH_3$ or —H.

[Chemical Formula 3]

By mixing the liquid A and liquid B and leaving it at room temperature or heating it, vinyl bases of the main body material and hydrogen atoms of the crosslinking agent are connected to each other to form gigantic molecules of silicone rubber. The silicone oil is not changed during the crosslinking reaction, thus the resulted material has a chemical structure wherein silicone oil is included in silicone rubber. Since this reaction is an addition reaction, in principle, the relation does not produce any byproduct and hence the crosslinking reaction proceed uniformly in the vicinity of the surface as well as inside. The reaction proceeds in the gel phase, and therefore even after it is thermally expanded in the ambient temperature, the whole volume changes uniformly. Therefore the resulted strains by stress in the transparent bodies 39 and 40 is very small. Consequently, it is advantageous that the polarization separation beam splitter has very little birefringence, which is harmful and should be excluded. Further, for the transparent bodies 39 and 40, it is possible to use a transparent silicone resin which is in liquid phase at the time of assembly and is transformable into the gel phase by a UV-light illumination. As for such silicone resin, for example, a transparent silicone resin OF113 of Shin'etsu Kagaku Kogyo K. K. can also be used.

Hereupon, the transparent bodies 39 and 40 are not limited only to the silicone resin, but also can be of other materials as long as they are transparent and heat-resisting. For example, liquids such as ethylene glycol solution or a mixed solution of ethylene glycol, diethyl ene glycol and glycerin can also be used.

A light 41 incident from the transparent plate 32 transmits through the transparent body 39, and after it is incident upon the polarization separation mirror 38 at an angle of 60°, it is separated into the S-polarization component 42 and the P-polarization component 43 by the polarization separation mirror 38. The S-polarization component 42 transmits through the transparent body 39 and comes out from the transparent plate 33, whereas the P-polarization component 43 transmits through the transparent body 40 and comes out from the transparent plate 34.

The configuration of the multi-layer thin films of the polarization separation mirror 38 is shown in TABLE 3. Taking a standard incident angle on the polarization separation mirror 38 to be 60°, the followings are used:

a transparent silicone resin KE1051 of a refractive index of 1.40 for the transparent bodies 39 and 40, a float glass plate of refractive index of 1.52 for the glass substrate of the polarization separation mirror 38, silicon dioxide of a refractive index of 1.46 for the low refractive index films, and titanium dioxide of a refractive index of 2.3 for the high refractive index films.

TABLE 3

| | | Standard Incident Angle 60° | |
|---|---|---|---|
| | Refractive Index | First Multi-Layers Thin Film Film Thickness d (nm) | Second Multi-Layers Thin Film Film Thickness d (nm) |
| | 1.52 | | |
| 1 | 1.46 | 145.5 | 104.5 |
| 2 | 2.30 | 92.4 | 66.3 |
| 3 | 1.46 | 145.5 | 104.5 |
| 4 | 2.30 | 92.4 | 66.3 |
| 5 | 1.46 | 145.5 | 104.5 |
| 6 | 2.30 | 92.4 | 66.3 |
| 7 | 1.46 | 145.5 | 104.5 |
| 8 | 2.30 | 92.4 | 66.3 |
| 9 | 1.46 | 145.5 | 104.5 |
| 10 | 2.30 | 92.4 | 66.3 |
| 11 | 1.46 | 145.5 | 104.5 |
| 12 | 2.30 | 92.4 | 66.3 |
| 13 | 1.46 | 145.5 | 104.5 |
| | 1.755 | | |

Figure 10:
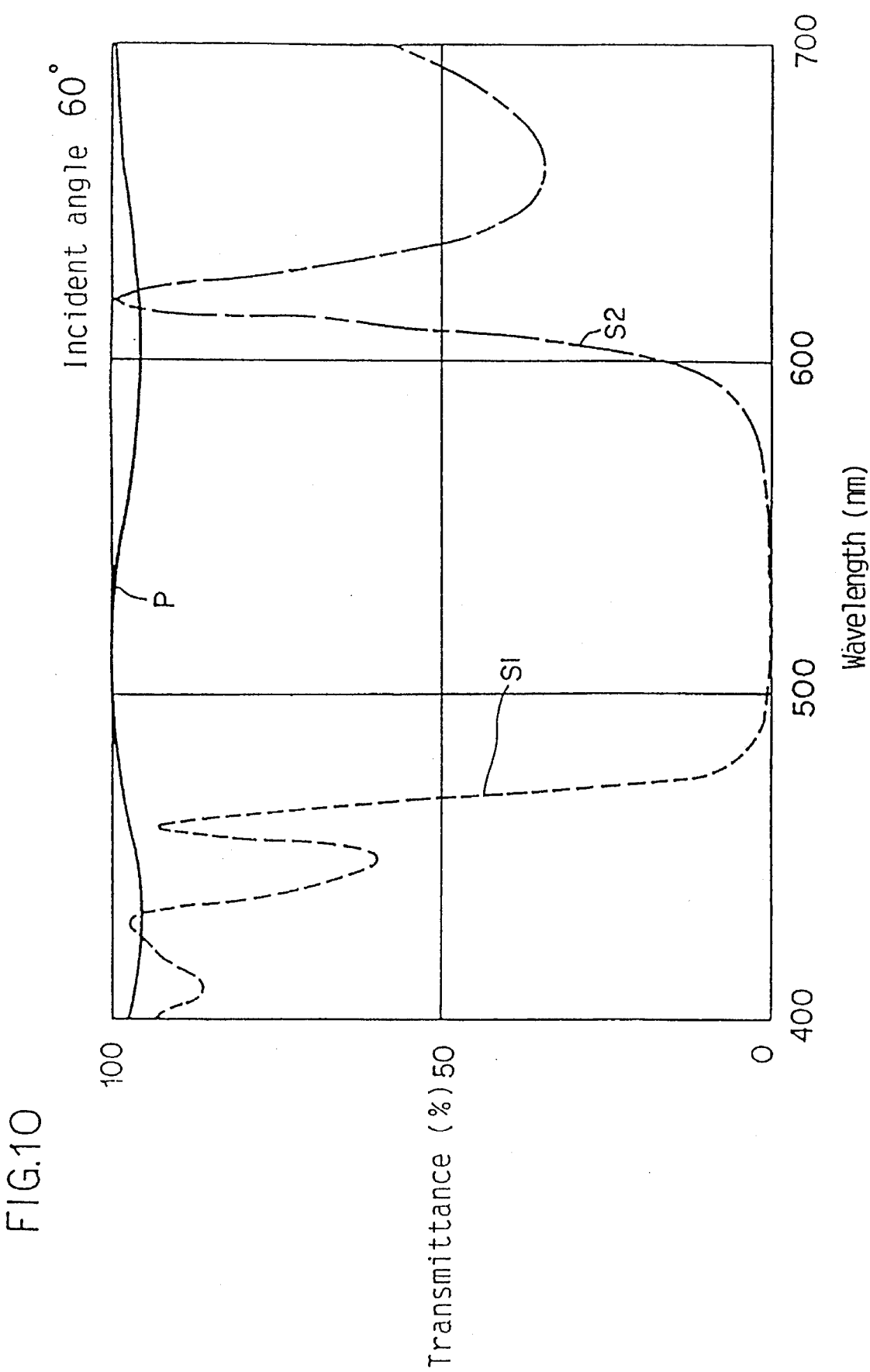
FIG. 10 is a characteristic curve for explaining a spectral transmittance of the polarizing apparatus of the present invention.
Figure 11:
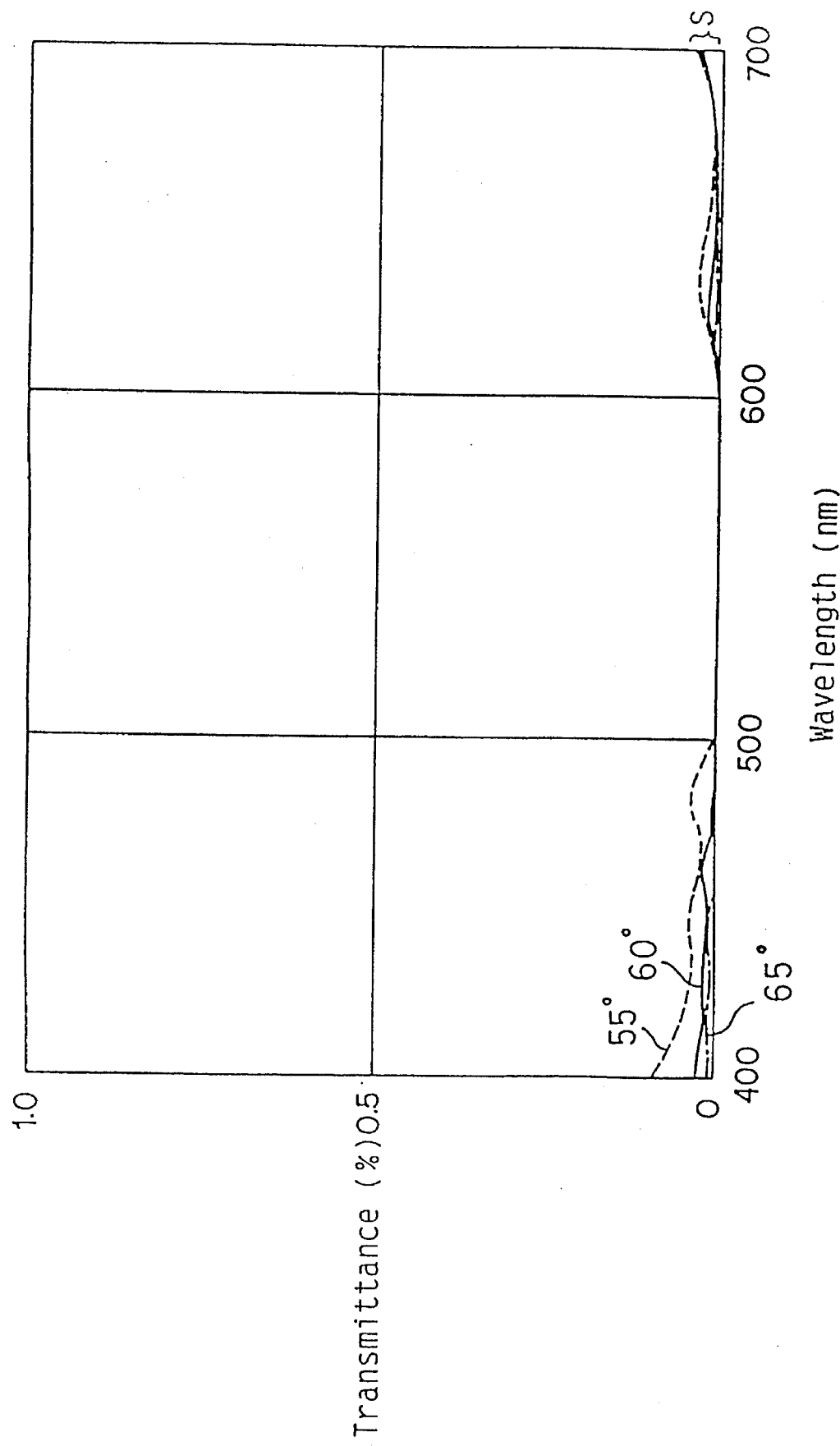
FIG. 11 is a characteristic curve for explaining another spectral transmittance of the polarizing apparatus of the present invention.
Figure 12:
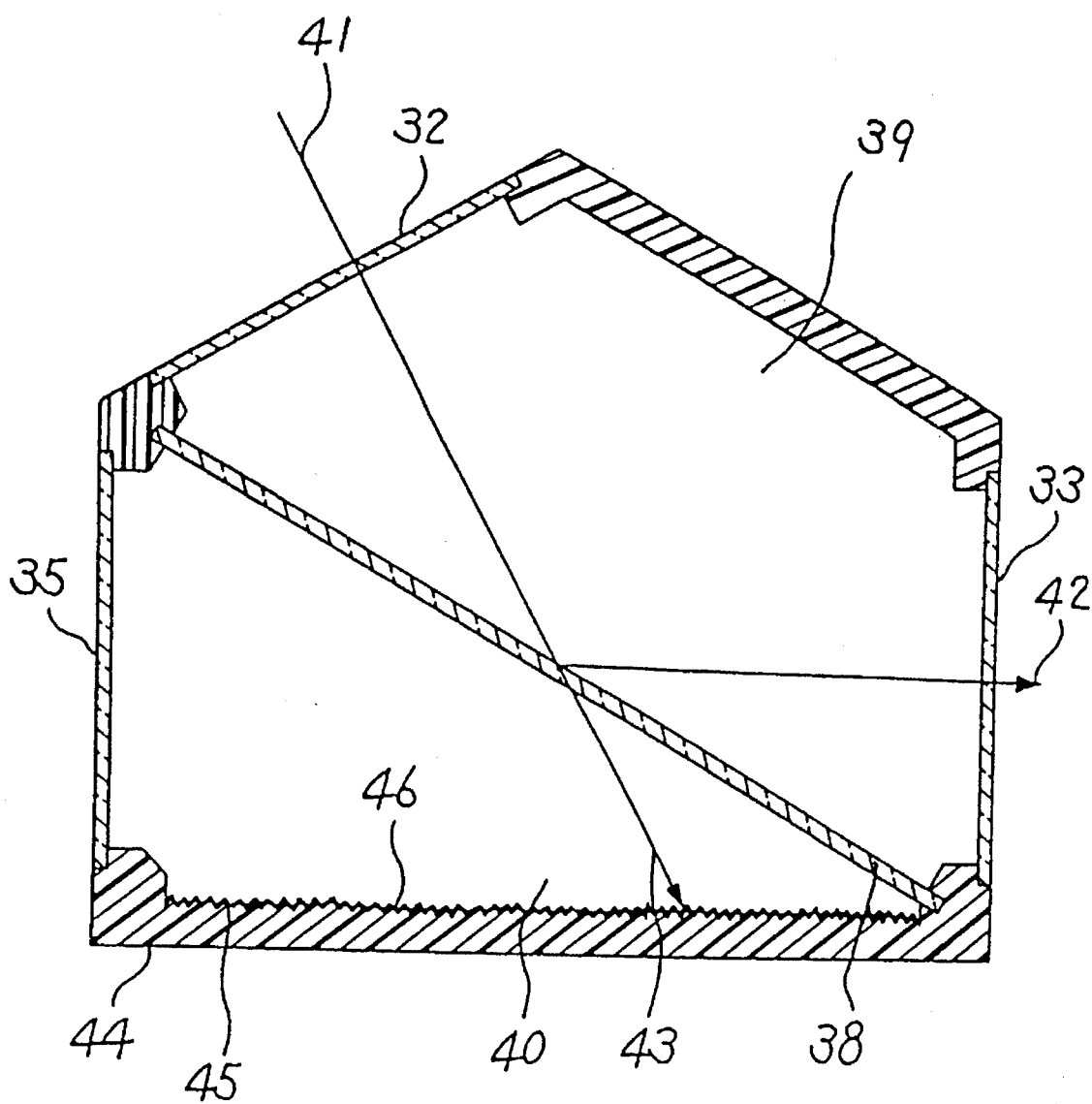
FIG. 12 is a cross-sectional side view of the polarizing apparatus of the present invention.

Spectral transmittance; of the polarization separation mirror of TABLE 3 over a wavelength range of 400 nm to 700 nm is shown in the graphs of FIG. 10 and FIG. 11. In these graphs, similarly with the previous embodiment, in FIG. 10, the total P-polarization component transmittance (P) is shown by a solid curve, the S-polarization component transmittance of the first multi-layer thin film (S1) is shown by a broken curve, and the S-polarization component transmittance of the second multi-layer thin film (52) is shown by a dotted broken curve. In FIG. 11, on the total S-polarization component transmission characteristic (S) which is resulted by combining the transmission characteristic of the first multi layer thin film and that of the second multi layer thin film, its incident angle dependency is shown. It is understood from FIG. 10 and FIG. 11 that the transmittance of the P-polarization component is kept as high as more than 90% whereas the transmittance of the S-Polarization component is kept as small as less than 0.1% over a wavelength range of 400 nm to 700 nm even at the time when the incident angle of the light leans as much as ±5° (in air) from the standard incident angle (60°), and hence it is understood that the incident angle dependency is also very little.

In case where the polarizing apparatus shown in FIG. 9 is used in a projection display apparatus using a reflection type birefringent light valve, the unnecessary P-polarization component 43 outgoes from the transparent plate 34, and a part thereof is reflected by this transparent plate 34 and propagates toward the screen. And it may cause happens that an unfavorable influence of lowering the contrast of the projection image. In such case, it is possible to prevent this lowering of the contrast by removing a transparent plate 34 and instead providing a light absorbing means by forming a minute roughness 45 on a region of such inside surface of the frame 44 on that the P-polarization component is incident and coating an absorbing material 46 thereover.

Hereupon, in the polarizing apparatus of the present invention, it is also possible to take a constitution of using a plural number of polarization separation mirrors and placing those polarization separation mirrors in parallel. In this case also, the spectral transmittance characteristics of a plural number of multi-layers thin films formed on those respective polarization separation mirrors are arranged such that they are different from each other. By doing this, likewise in the previous embodiments, the usable wavelength range as well as the usable incident angle range can be maintained wide.

In the following, explanation is given on embodiments of the projection display apparatus of the present invention.

Figure 13:
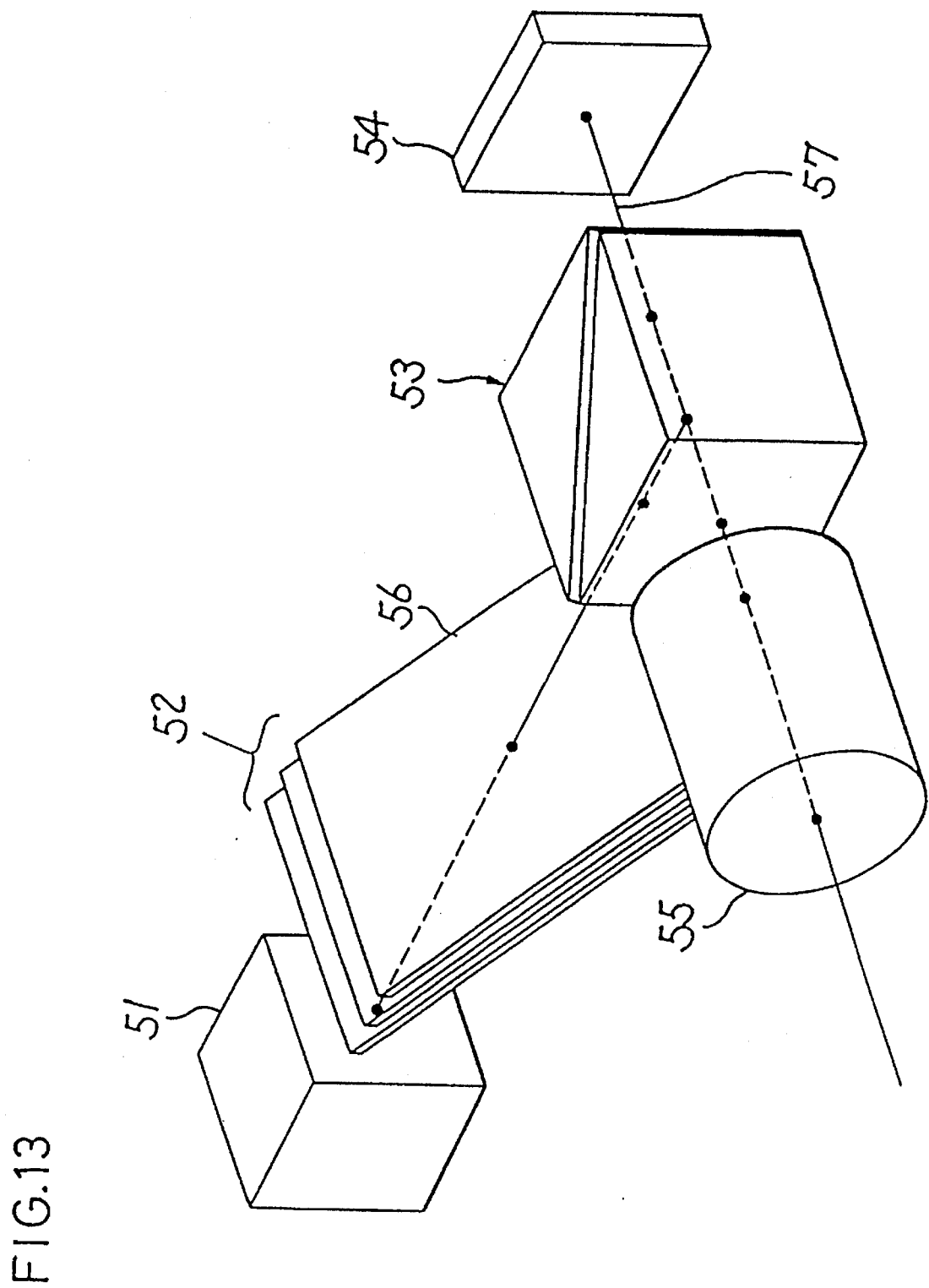
FIG. 13 is a perspective view of a projection display apparatus of the present invention.

One embodiment of the projection display apparatus using the polarizing apparatus of the present invention is shown in FIG. 13. A polarizing apparatus 53 that is used as a polarizer and in common as an analyzer has the same constitution as that shown in FIG. 1. As a light source 51, a metal halide lamp is used, and as for a liquid crystal panel 54, the one using a twisted nematic liquid crystal is used.

Figure 14:
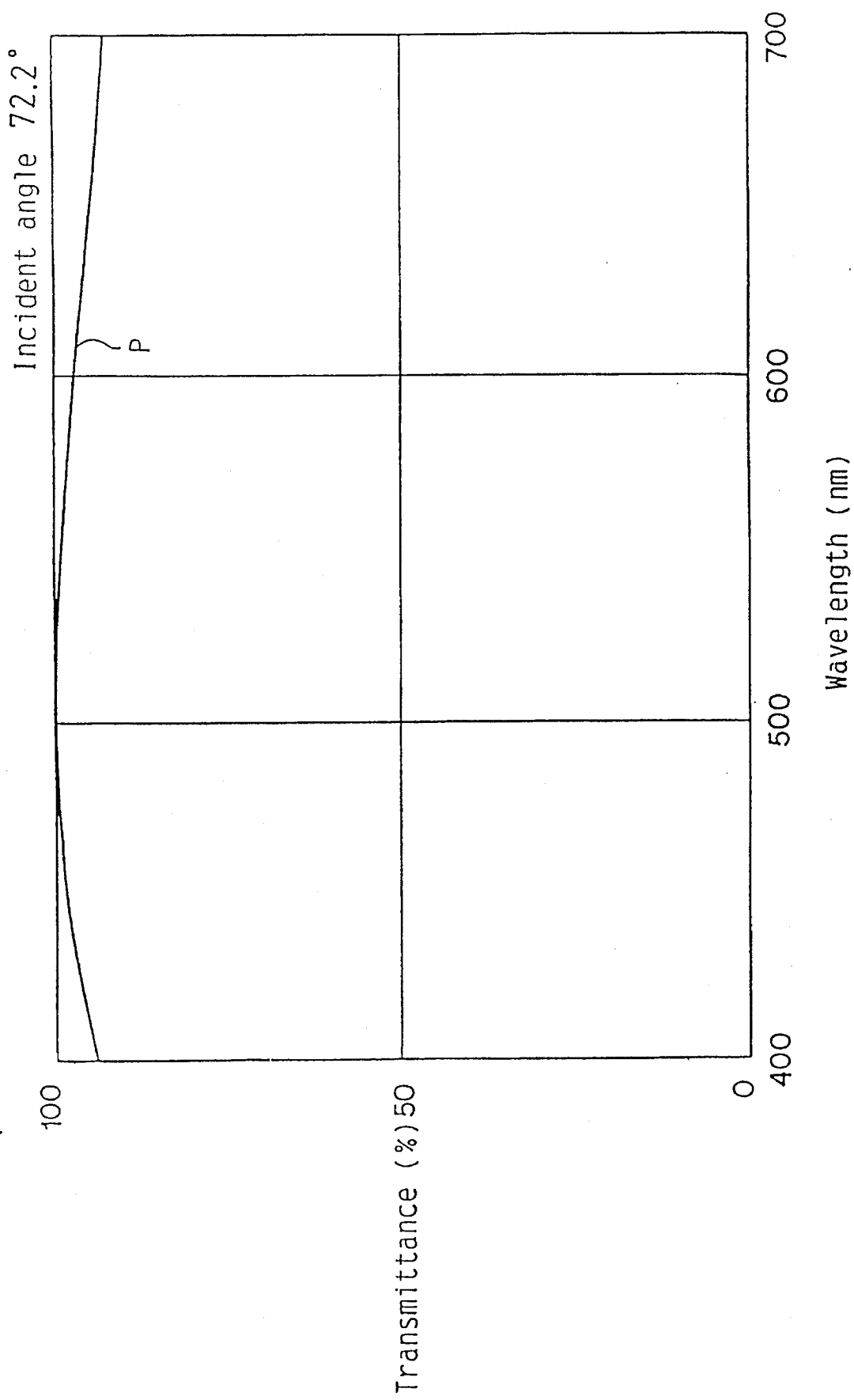
FIG. 14 is a characteristic curve for explaining a spectral transmittance of a pre-polarizer.
Figure 15:
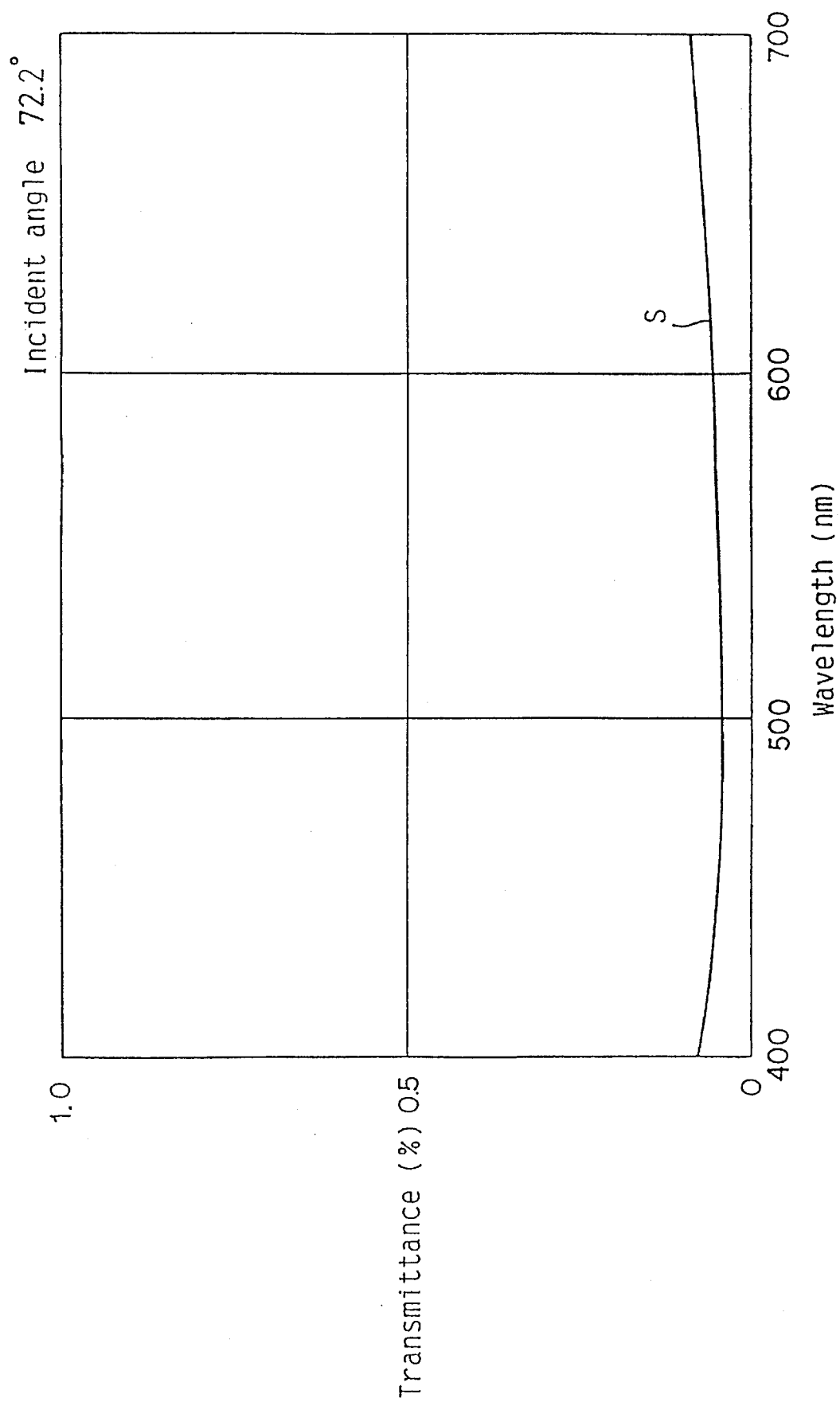
FIG. 15 is a characteristic curve for explaining another spectral transmittance of the pre-polarizer of the present invention.

A pre-polarizer 52 is constituted in a manner that three plates of glass substrate having optical thin films on their both surfaces are laminated inserting thin air gap layers therebetween and placed with a leaning angle (72.2° to the optical axis 56) such that the transmittance characteristic of the P-polarization component becomes approximately 100% at specified wavelength (500 nm in this case). For the optical thin films is used titanium dioxide whose refractive index (refractive index n=2.3) is a highest one among those of practically transparent materials, and the film thickness is 59.7 nm for achieving a maximum reflectance of S-polarization component at 500 nm wavelength. The spectral transmittance of the pre-polarizer 52 is shown in FIG. 14 and FIG. 15, wherein the incident angle of the light is set to be 72.2°. FIG. 14 shows the transmittance of the P-polarization component, (P) and FIG. 15 shows the transmittance of the S-polarized component (S). It is understood from FIG. 14 and FIG. 15 that the transmittance of the P-polarization component exhibits a high transmittance of more than 90% whereas the S-polarization component exhibits a low transmittance of less than 0.1%.

The incident plane of the pre-polarizer 52 (plane which includes a normal of the thin film forming plane and an optical axis 56) and the incident plane of the polarizing apparatus 53 (i.e., plane which includes a normal of the polarization separation mirror plane and optical axis 56) are placed such that they are crossing perpendicularly to each other, and thereby the P-polarization component transmitted through the pre-polarizer 52 is reflected as an S-polarization component by the polarizing apparatus 53.

When the natural light emitted from the metal halide lamp light source 51 is incident on the pre-polarizer 52, a linearly polarized light with direction of polarization in the vertical direction in picture plane on the liquid crystal panel 54 comes out. This linearly polarized light is incident on the polarizing apparatus 53 working as a polarizer. Then the linearly polarized light is reflected toward a liquid crystal panel 54 as the S-polarization component by the polarization separation mirror therein. The S-polarization component incident on the reflection type liquid crystal panel 54 is reflected thereby and modulated into an elliptically polarized light in accordance with the modulation video signal applied thereon and incident again upon the polarizing apparatus 53 which works as an analyzer this time. The light that was converted into the P-polarization component by the reflection type liquid crystal panel 54 is transmitted through the polarizing apparatus 53 and it is projected onto a screen (not shown in the figure) by a projection lens 55. The residual S-polarization component that was not converted into the P-polarization component is reflected again by the polarizing apparatus 53 and goes back toward the light source 51.

The polarizing apparatus of the present invention has a very small incident angle dependency. It can keep the transmittance of the S-polarization component as low as less than 0.4% over a wavelength range of 400 nm to 700 nm even at the time when the incident angle of the light in air leans as much as ±5°. Since the P-polarization component can keep the transmission of the P-polarization component as high as more than 90%, under the same incident angle deviation condition it becomes possible to display a projection image of a high contrast ratio of more than 200:1.

Apart from the above-mentioned example of FIG. 13, wherein the polarizing apparatus 53 shown in FIG. 1 was used in the above-mentioned embodiment, other type polarizing apparatus described above can be used also.

And, for the pre-polarizer 52, it is possible to cut those three glass substrates into plural number, respectively, and arrange them so that their cross-sectional form takes a zig-zag shape. By doing so, the thickness in the optical axis direction can be reduced, thereby contributing to the set size reduction by making the pre-polarizer compact.

Figure 16:
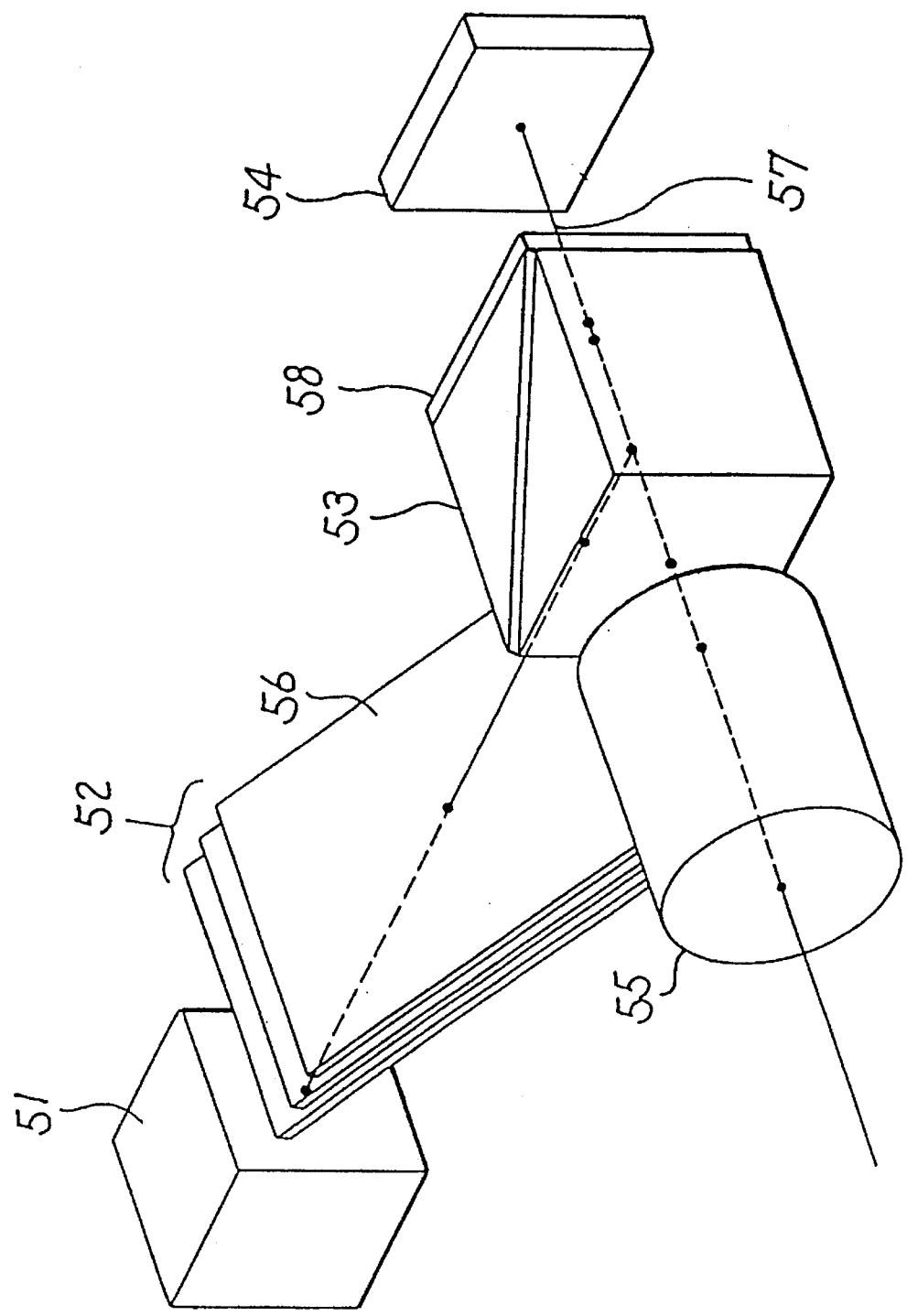
FIG. 16 is a perspective view showing an outline constitution of a projection display apparatus of the present invention.

In the constitution shown in FIG. 13, in case the polarizing apparatus 53 is used in common as a polarizer and an analyzer, when the diverging angle of the incident light becomes large, the polarization direction of the light incident to the analyzer cannot be used optimally inducing a lowering of contrast of projection image. In this case, it is desirable to place a quarter-wave plate 58 between the light polarizer 53 and the liquid crystal panel 54 as is shown in FIG. 16.

The quarter-wave plate 58 is of such a type that the phase difference between its fast optic axis and its slow optic axis are quarter wavelength at the center wavelength of the light emitted from the light source 51. This quarter-wavelength plate 58 is placed such that its fast optic axis or slow optic axis crosses perpendicularly with a plane including the incident light optical axis 56 and reflected light optical axis 57 of the polarizing apparatus 53.

In case the light ray is incident obliquely onto the polarizing apparatus 53, the light ray emitted from the polarizing apparatus 53 working as a polarizer becomes a linearly polarized light whose polarization direction was rotated from an ideal direction. However, if the light ray passes through the quarter-wave plate 58 twice on its transmitting toward and reflected back ways from the liquid crystal panel 54, transmitted ray becomes a linearly polarized light whose polarization direction was rotated twice in mutually reverse directions. Therefore, the rotation caused by the obliqueness of the incident light ray direction is canceled out, and the resulted polarization direction becomes an angle at which the polarizing apparatus 53 can be used optimally as an analyzer. Therefore, the usable diverging angle of the incident light ray as the polarizing apparatus 53 becomes wide, and thereby the projection image can be made brighter without losing its contrast.

However, concerning the light emitted from the transmission characteristic of the first multi layers thin polarizing apparatus 53 and reflected back from the light-polarizer-53-side surface of the quarter-wave plate 58, deviation of its polarization direction from the ideal direction is not corrected. This reflected light becomes main factor for the loss of contrast. Then, by cementing the quarter-wave plate 58 to the polarizing apparatus 53 by a transparent cement or a transparent adhesive, the surface reflection on the quarter-wave plate 58 becomes absent, and thereby the contrast is improved further.

In case the constitution shown in FIG. 9 is used as the polarizing apparatus, the same effect can be obtained by cementing a quarter-wave plate to the transparent-filling material-39-side of the transparent plate 33.

The light source 51 comprises a lamp, a collimating optical system for collimating a light emitted from the lamp into an nearly parallel light ray, and filters for rejecting UV- and IR-lights. Besides a metal halide lamp, other lamps such as halogen lamp and xenon lamp can also be used.

Figure 17:
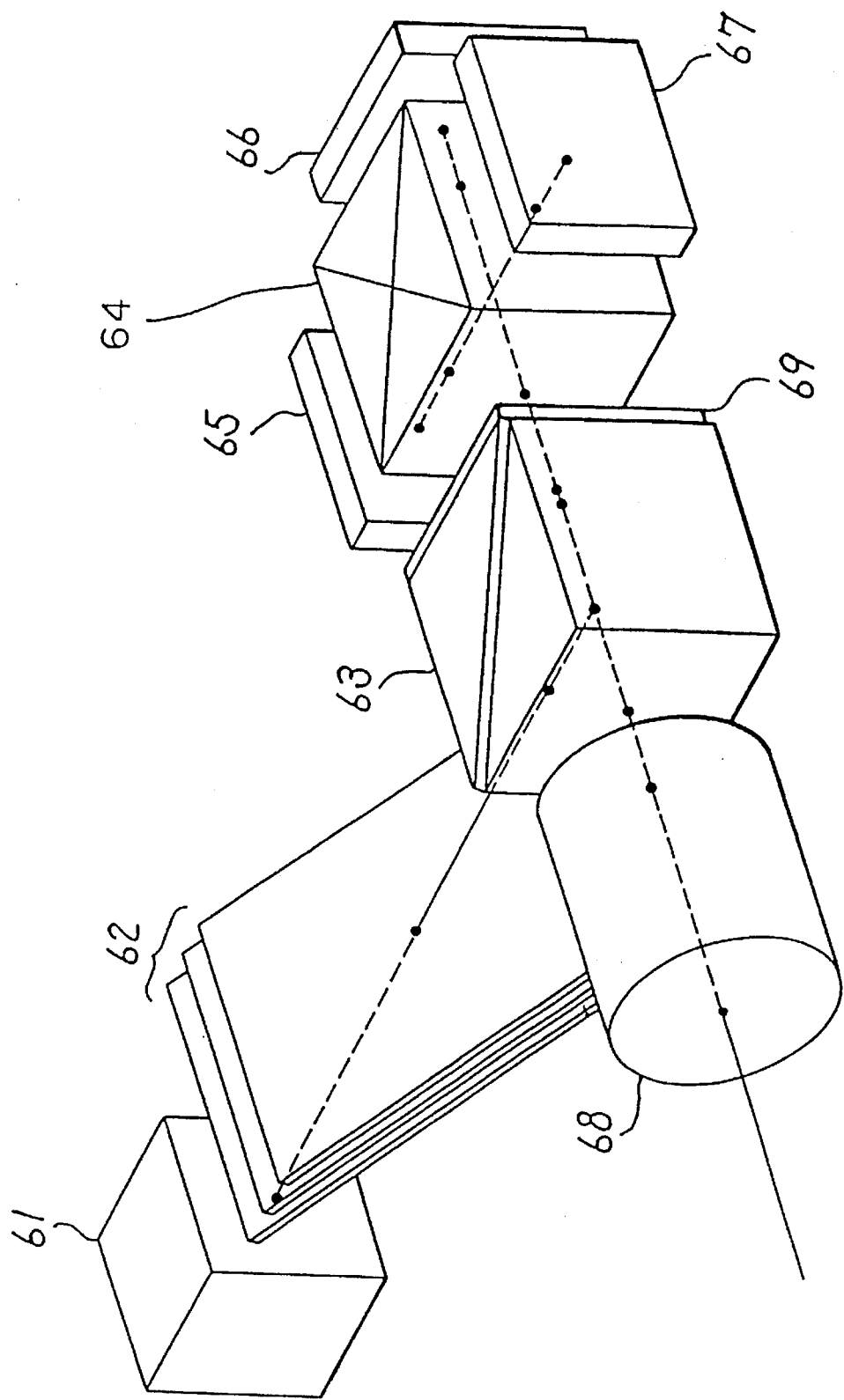
FIG. 17 is a perspective view showing an outline constitution of the projection display apparatus of the present invention.

In the following, the constitution of another embodiment of the projection display apparatus of the present invention is shown in FIG. 17. A pre-polarizer 62, a polarizing apparatus 63, and liquid crystal panels 65, 66, and 67 are the same ones as those shown in FIG. 16.

A light source 61 emits the light including color components of three primary colors of red, green and blue. The light emitted from the light source 61 is incident on the pre-polarizer 62, and then a linearly polarized light with polarization direction vertical in picture planes on the liquid crystal panels 65, 66 and 67 is transmitted therefrom. This linearly polarized light is incident on the polarizing apparatus 63 working as a polarizer, then it is reflected there as the S-polarization component and decomposed into three color lights of red, green, and blue by a dichroic prisms 64. These three color lights are incident on their corresponding reflection type liquid crystal panels 65, 66, and 67, respectively, and their respective reflected lights are modulated into respective elliptically polarized lights and combined again by the dichroic prism 64. Thereafter the modulated lights are incident on the polarizing apparatus 63 working as an analyzer. Among those reflected lights from the liquid crystal panels 65, 66, and 67, the lights that were converted into the P-polarization component are transmitted through the polarizing apparatus 63 and are projected onto a screen (not shown in the figure) by a projection lens 68. On the other hand, the S-polarization components that were not converted are reflected by the polarizing apparatus 63 and proceed toward the direction of the light source 61

In the projection display apparatus of the present embodiment also, similarly as in the preceding embodiment, since the polarizing apparatus of the present invention whose S-polarization component transmittance is kept very low is used, high contrast projection image can be displayed.

And, similarly to the constitution of FIG. 16, it is also possible to cement a quarter-wave plate 69 on the dichroic-prism-64-side surface of the polarizing apparatus 63. Furthermore, it is also possible to join by cementing the polarizing apparatus 63 and the dichroic prism 64 sandwiching a quarter-wave plate 69 therebetween. In both cases, contrast of the projection image can be improved further.

For the quarter-wave plate 69, it is also possible to take a constitution of preparing three quarter-wave plates respectively for those three colors of red, green, and blue by setting their phase differences between their fast and slow optic axes to be quarter wavelength at their center wavelengths and placing them respectively between the liquid crystal panels 65, 66, and 67 and the dichroic prism 64.

Figure 18:
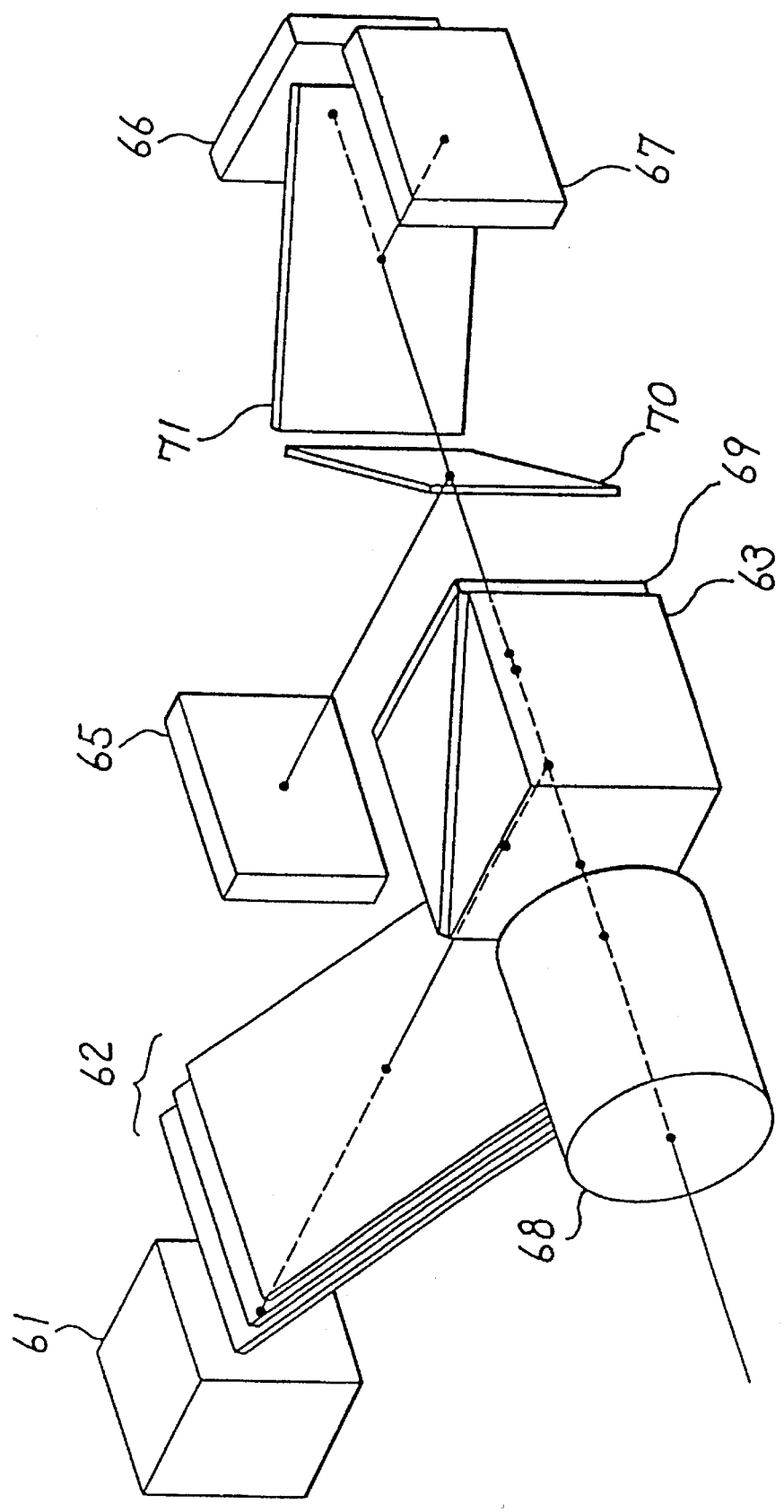
FIG. 18 is a perspective view showing an outline constitution of the projection display apparatus of the present invention.
Figure 19:
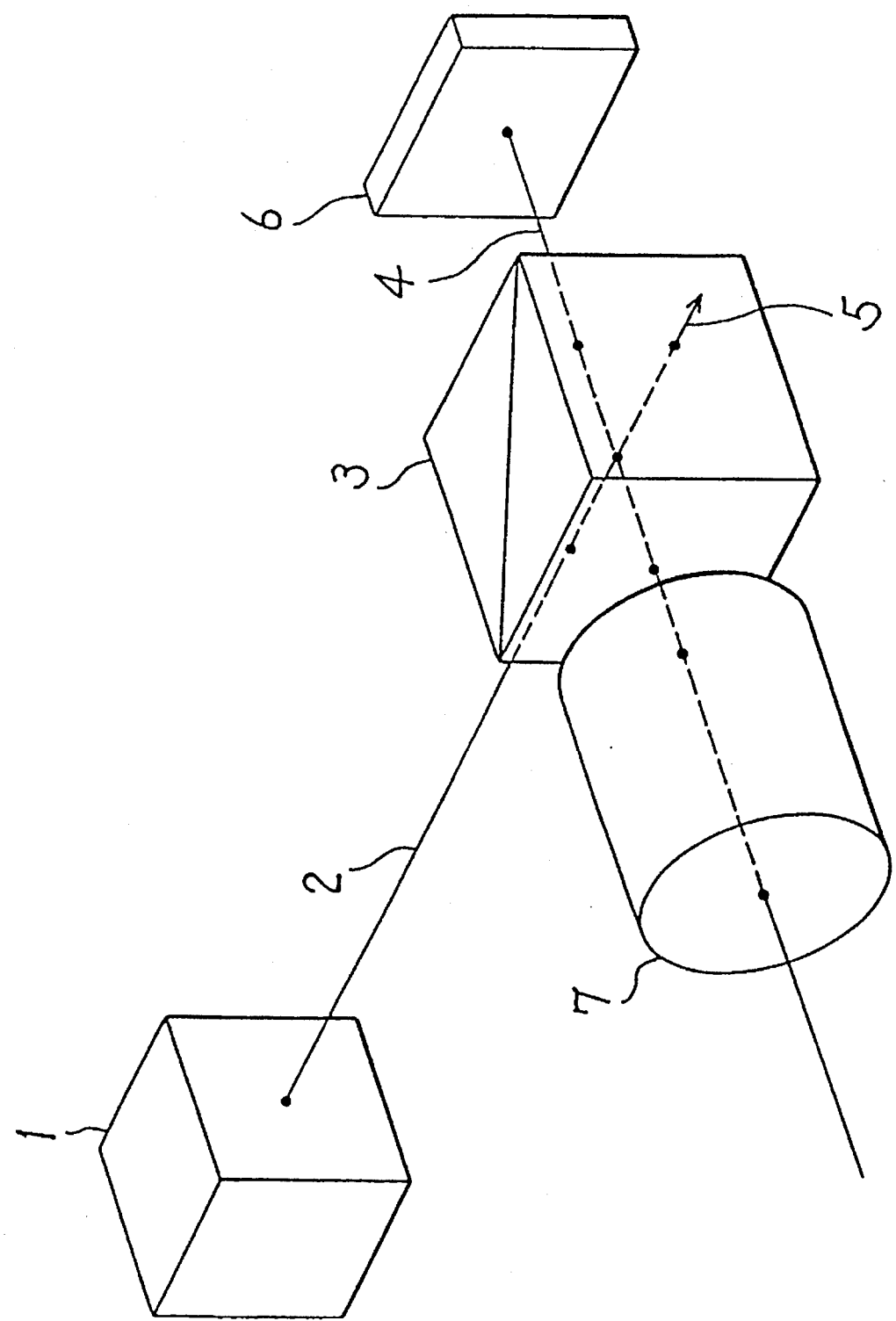
FIG. 19 is a perspective view showing an outline constitution of a projection display apparatus of prior art.

Apart from the constitution shown in FIG. 17, wherein as for the color separation optical system by which the light emitted from the light source 61 is separated into three colors, the dichroic prism 64 in which color separation planes are crossed in an X-letter shape has been use, an alternative configuration can be made by employing two color separation mirrors 71 and 72 as shown in FIG. 18.

Apart from the use of the light polarizer 63, shown in FIG. 1 in the present embodiment, other light polarizer described in other embodiments can also be used in this embodiment.

In the afore-mentioned embodiments, only the scheme using the liquid crystal display as a light valve has been described as examples. However, any other device such as an electro-optic crystal device, that is capable of forming optical images as the change of the birefringence responding to the video signals, can also be used as a light valve.

As has been described above, in accordance with the present invention, since it takes a constitution in which a transparent plane parallel plate having two polarization separation mirrors is sandwiched between two transparent bodies, it can offer a polarizing apparatus in which the S-polarization component reflectance is kept very high over a wide wavelength range and light incident angle dependency is very little. And by using this light polarizer, a projection display apparatus that is capable of displaying high-bright and high-contrast projection images and being compact in its size, introducing a great advantage.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A polarizing apparatus comprising:

a first transparent block (11, 21) having at least three plane surfaces for transmitting light, a second transparent block (12, 22) having at least three transparent surfaces for transmitting light, first and second polarization separation films (19, 20) having mutually different spectral transmittances of S-polarization component (15, 25) the films being evaporation-deposited on opposite planes of a transparent glass substrate (18), respectively, thereby forming a polarization separation means (13, 23) which is located between one plane of said first transparent block (11, 21) and one plane of said second transparent block (12, 22).

2. A polarizing apparatus in accordance with claim 1 wherein at least one of said first transparent block and said second transparent block is of a triangular prism shape.

3. A polarizing apparatus in accordance with claim 1 wherein said first transparent block and second transparent block are glass.

4. A polarizing apparatus in accordance with claim 1 wherein said second transparent block has a light absorption means at a P-polarized light outgoing plane.

5. A polarizing apparatus in accordance with claim 1 wherein said polarization separation means comprises multi-layer thin films on both sides of said transparent substrate, each multi-layer thin film comprising lamination of optical thin films.

6. A polarizing apparatus in accordance with claim 5 wherein said multi-layer thin films each comprise an alternate lamination of two kinds of optical thin films each having mutually different refractive indices.

7. A projection display apparatus comprising:

a light source, a pre-polarizer which takes out a substantially linearly polarized light from light emitted from said light source, a polarizing apparatus of claim 1 for serving in common as a polarizer and an analyzer, a reflection type light valve which reflects said light modulating its polarization state, and a projection lens for projecting optical images formed at said light valve.

8. A projection display apparatus in accordance with claim 7 wherein said pre-polarizer comprises a plural number of transparent substrates disposed parallelly with intermediating thin air gap layers inbetween, said transparent substrates each having on both surfaces thereof optical thin films of a refractive index which is higher than that of said substrate.

9. A projection display apparatus in accordance with claim 7 wherein said light valve is a liquid crystal display device.

10. A projection display apparatus in accordance with claim 7 wherein a quarter-wave plate is provided between said polarizing apparatus and said light valve, said quarter-wave plate being disposed in a manner that a fast optic axis or slow optic axis crosses perpendicularly with a plane including the incident light optical axis and reflected light optical axis of said polarizing apparatus.

11. A projection display apparatus in accordance with claim 10 wherein said polarizing apparatus and said quarter-wave plate are cemented to each other.

12. A projection display apparatus comprising:

a light source for emitting light color components of three primary colors, a pre-polarizer for taking out a substantially linearly polarized light from light emitted from said light source, a polarizing apparatus of claim 1 for serving in common as a polarizer and an analyzer, a color decomposition means for decomposing the output light from said polarizing apparatus into three primary colors, three reflection type light valves for reflecting the light modulating the polarization state, and a projection lens for projecting optical images formed at said light valve onto a screen.

13. A projection display apparatus in accordance with claim 12 wherein said pre-polarizer comprises a plural number of parallelly disposed transparent substrates with intermediating thin air gap layers inbetween, said transparent substrates each having on both surfaces thereof optical thin films of a refractive index which is higher than that of said substrate.

14. A projection display apparatus in accordance with claim 12 wherein said light valve is a liquid crystal display device.

15. A projection display apparatus in accordance with claim 12 wherein a quarter-wave plate is provided between said polarizing apparatus and said light valve, said quarter-wave plate being disposed in a manner such that a fast optic axis or slow optic axis crosses perpendicularly with a plane including the incident light optical axis and reflected light optical axis of said polarizing apparatus.

16. A projection display apparatus in accordance with claim 15 wherein said polarizing apparatus and said quarter-wave plate are cemented to each other.

17. A polarizing apparatus comprising:

at least three transparent plates (32, 33, 35) for transmitting light, a frame (31), first and second polarization separation films (19, 20) having mutually different spectral transmittances of S-polarization component (42), the films being formed on opposite planes of a transparent glass substrate (18), respectively, thereby forming a polarization separation means (38), said at least three transparent plates (32, 33, 35), said frame (31) and said polarization separation means (38) constituting a vessel having two chambers separated by said polarization separation means (38), said three transparent plates (32, 33, 35) being located on three sides of said vessel for transmitting light therethrough, and, at least a transparent material (39, 40) which is in a liquid state at least at one time and subsequently in a gel phase or solid phase and filled in said two chambers, respectively.

18. A polarizing apparatus in accordance with claim 17 wherein said transparent filler material is ethylene glycol solution, or a mixed solution of ethylene glycol, diethylene glycol, and glycerin, or a transparent silicone resin which is transformable to solid phase or gel phase with time.

19. A polarizing apparatus in accordance with claim 17 wherein said frame has a light absorption means on the inner surface where an P-polarization component is incident.

20. A polarizing apparatus in accordance with claim 17 wherein said polarization separation means (38) comprises multi-layer thin films (19, 20) on both sides of said transparent planes of said substrate (18), each multi-layer films comprising laminations of optical thin films.

21. A polarizing apparatus in accordance with claim 20 wherein said multi-layer thin films each comprise an alternate lamination of two kinds of optical thin film each having mutually different refractive indices.

22. A projection display apparatus comprising:

a light source, a pre-polarizer which takes out a substantially linearly polarized light from light emitted from said light source, a polarizing apparatus of claim 17 for serving in common as a polarizer and an analyzer, a reflection type light valve which reflects said light modulating its polarization state, and a projection lens for projecting optical images formed at said light valve.

23. A projection display apparatus comprising:

a light source for emitting the light color components of three primary colors, a pre-polarizer for taking out a substantially linearly polarized light from light emitted from said light source, a polarizing apparatus of claim 17 for serving in common as a polarizer and an analyzer, a color decomposition means for decomposing the output light from said polarizing apparatus into three primary colors, three reflection type light valves for reflecting the light modulating the polarization state, and a projection lens for projecting optical images formed at said light valve onto a screen.

\* \* \* \* \*